(12) United States Patent
Park et al.

(10) Patent No.: US 12,488,816 B2
(45) Date of Patent: Dec. 2, 2025

(54) TRANSMITTER, MEMORY DEVICE AND SEMICONDUCTOR DEVICE INCLUDING THE TRANSMITTER

(71) Applicant: SAMSUNG ELECTRONICS CO., LTD., Suwon-si (KR)

(72) Inventors: Junyoung Park, Suwon-si (KR); Garam Kim, Suwon-si (KR); Joohwan Kim, Suwon-si (KR); Jindo Byun, Suwon-si (KR); Eunseok Shin, Suwon-si (KR); Hyunyoon Cho, Suwon-si (KR); Junghwan Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 192 days.

(21) Appl. No.: 18/230,776

(22) Filed: Aug. 7, 2023

(65) Prior Publication Data
US 2024/0203466 A1 Jun. 20, 2024

(30) Foreign Application Priority Data

Dec. 19, 2022 (KR) ........................ 10-2022-0178688

(51) Int. Cl.
*G11C 7/10* (2006.01)
*H03K 19/017* (2006.01)
(52) U.S. Cl.
CPC .......... *G11C 7/1066* (2013.01); *G11C 7/1063* (2013.01); *H03K 19/01742* (2013.01)
(58) Field of Classification Search
CPC ................. G11C 7/1066; G11C 7/10

USPC ....................................................... 365/233.1
See application file for complete search history.

(56) References Cited

U.S. PATENT DOCUMENTS

| | | | |
|---|---|---|---|
| 7,154,918 B2 * | 12/2006 | Takauchi ................ | H03M 9/00 370/537 |
| 7,893,718 B2 | 2/2011 | Park et al. | |
| 8,085,082 B2 | 12/2011 | Penzes | |
| 10,135,600 B2 | 11/2018 | Walker et al. | |
| 10,560,097 B1 | 2/2020 | Peng et al. | |
| 10,749,505 B2 * | 8/2020 | Rao .......................... | H04J 3/06 |
| 2011/0156754 A1 * | 6/2011 | Byeon ..................... | H03M 9/00 326/115 |

(Continued)

FOREIGN PATENT DOCUMENTS

KR 10-0882804 B1 2/2009
KR 10-2420430 B1 7/2022

*Primary Examiner* — Muna A Techane
(74) *Attorney, Agent, or Firm* — Muir Patent Law, PLLC

(57) ABSTRACT

A transmitter configured to receive first to N-th data in parallel and sequentially output the first to N-th data in response to first to N-th clock signals having different phases from each other, where N is an integer of at least 2, the transmitter including first to N-th data selectors including a first data selector and a second data selector in correspondence to the first to N-th data, each of the first to N-th data selectors being configured to perform a logical operation on one of the first to N-th data and the first to N-th clock signals and output a plurality of data selection signals, a first pre-driver in correspondence to at least two data selectors among the first to N-th data selectors, the first pre-driver being configured to receive the plurality of data selection signals from the at least two data selectors.

20 Claims, 18 Drawing Sheets

(56) References Cited

U.S. PATENT DOCUMENTS

| | | | |
|---|---|---|---|
| 2022/0138045 A1* | 5/2022 | Park | G11C 7/222 714/755 |
| 2022/0166429 A1 | 5/2022 | Lee et al. | |
| 2022/0382317 A1* | 12/2022 | Park | G06F 1/06 |
| 2023/0208418 A1 | 6/2023 | Han et al. | |
| 2023/0208423 A1* | 6/2023 | Katta | H03K 19/01855 326/83 |

* cited by examiner

TRANSMITTER, MEMORY DEVICE AND SEMICONDUCTOR DEVICE INCLUDING THE TRANSMITTER

CROSS-REFERENCE TO RELATED APPLICATION

Korean Patent Application No. 10-2022-0178688, filed on Dec. 19, 2022, in the Korean Intellectual Property Office, is incorporated by reference herein in its entirety.

BACKGROUND

1. Field

A transmitter, memory device and semiconductor device including the transmitter is disclosed.

2. Description of the Related Art

Memory devices, such as low-power double data rate (LPDDR) synchronous dynamic random access memory (SDRAM) devices, may be usually used in various kinds of electronic devices, such as a smartphone, a tablet personal computer (PC), and an ultrabook.

SUMMARY

Embodiments are directed to a transmitter configured to receive first to N-th data in parallel and sequentially output the first to N-th data in response to first to N-th clock signals having different phases from each other, where N is an integer of at least 2, the transmitter including first to N-th data selectors including a first data selector and a second data selector in correspondence to the first to N-th data, each of the first to N-th data selectors being configured to perform a logical operation on one of the first to N-th data and the first to N-th clock signals and output a plurality of data selection signals, a first pre-driver in correspondence to at least two data selectors among the first to N-th data selectors, the first pre-driver being configured to receive the plurality of data selection signals from the at least two data selectors and output a first pull-up signal and a first pull-down signal by performing a logical operation on the plurality of data selection signals, and a first driver in correspondence to the first pre-driver, the first driver being configured to sequentially output at least two pieces of data in response to the first pull-up signal and the first pull-down signal.

Embodiments are directed to a memory device including a memory cell array storing data, a multi-phase clock generator configured to generate first to fourth clock signals in relation with transmission or reception of the data, the first to fourth clock signals having a phase difference of 90 degrees from each other, and a transmitter configured to output the data to an external device in response to the first to fourth clock signals, wherein the transmitter includes first to fourth data selectors in correspondence to first to fourth data, each of the first to fourth data selectors being configured to perform a logical operation on one of the first to fourth data and the first to fourth clock signals and output a plurality of data selection signals, a first pre-driver in correspondence to the first and second data selectors, the first pre-driver being configured to receive data selection signals related to the first data and the second data and output a first pull-up signal and a first pull-down signal by performing a logic operation on the data selection signals, and a first driver in correspondence to the first pre-driver, the first driver being configured to sequentially output the first data and the second data in response to the first pull-up signal and the first pull-down signal.

Embodiments are directed to a semiconductor device including an interface circuit configured to communicate data with an external device, and a multi-phase clock generator configured to generate first to N-th clock signals in relation with transmission or reception of the data, the first to N-th clock signals having different phases from each other, where N is an integer of at least 2, wherein the interface circuit includes a transmitter in correspondence to one of a plurality of data channels, and the transmitter includes first to N-th data selectors in correspondence to the first to N-th data, each of the first to N-th data selectors being configured to perform a logical operation on one of the first to N-th data and the first to N-th clock signals and output a plurality of data selection signals, a pre-driver in correspondence to first to M-th data selectors among the first to N-th data selectors, the pre-driver being configured to receive the plurality of data selection signals from the first to M-th data selectors and output a pull-up signal and a pull-down signal by performing a logical operation on the plurality of data selection signals, where M is an integer that is greater than or equal to 2 and less than M, and a driver in correspondence to the pre-driver, the driver being configured to sequentially output the first to M-th data at edge timings of the first to M-th clock signals in response to the pull-up signal and the pull-down signal.

BRIEF DESCRIPTION OF THE DRAWINGS

Features will become apparent to those of skill in the art by describing in detail exemplary embodiments with reference to the attached drawings in which.

DETAILED DESCRIPTION

Hereinafter, various embodiments will be described with reference to the accompanying drawings.

Figure 1:
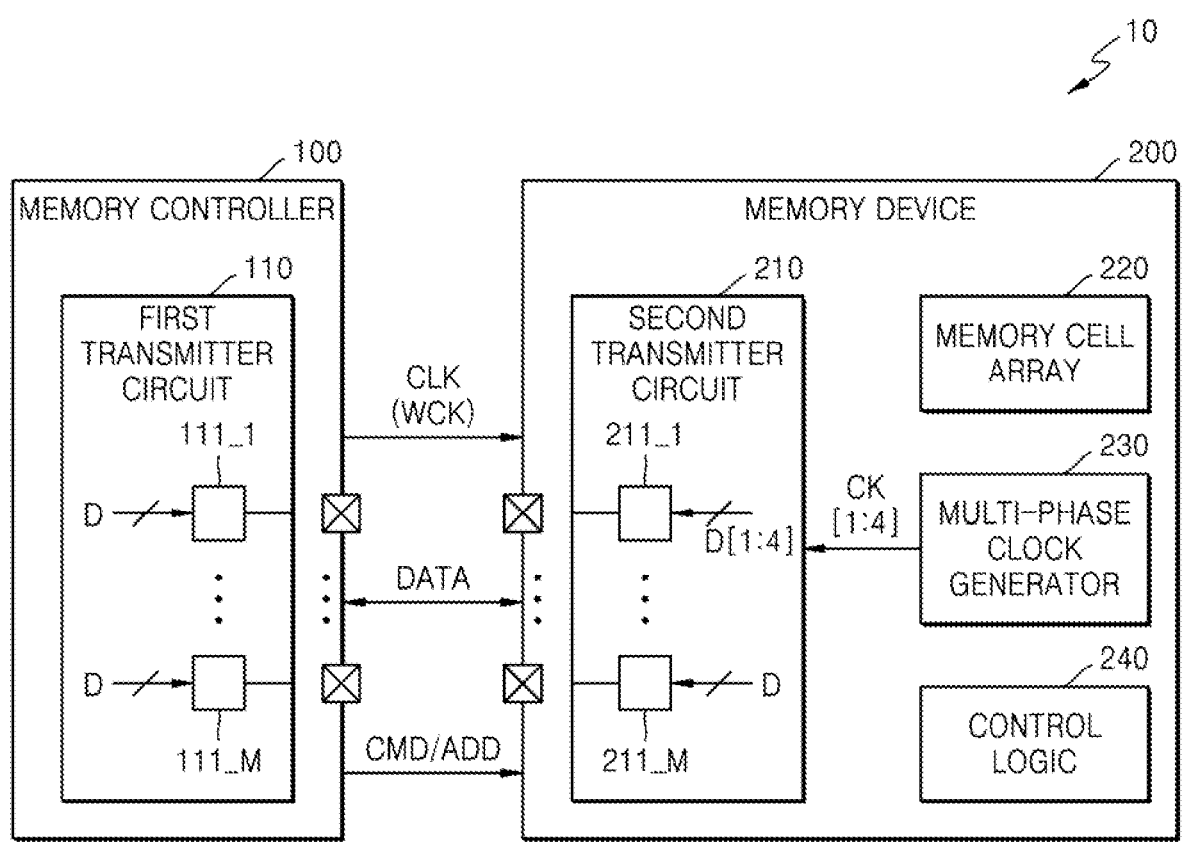
FIG. 1 is a block diagram of a memory system including a memory device, according to an example embodiment.

FIG. 1 is a block diagram of a memory system including a memory device, according to an example embodiment. Referring to FIG. 1, a memory system 10 may include a memory controller 100 and a memory device 200. The memory system 10 may be included in a personal computer (PC), a mobile electronic device, or a data server. The mobile electronic device may correspond to a laptop computer, a mobile phone, a smartphone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile Internet device (MID), a wearable computer, an Internet of things (IoT) device, an Internet of everything (IoE) device, or a drone. As used herein, the term "or" is not an exclusive term, e.g., "A or B" would include A, B, or A and B.

The memory controller 100 may include or may be included in an integrated circuit (IC), a system-on-chip (SoC), an application processor (AP), a mobile AP, a chipset, or a set of chips. The memory controller 100 may correspond to a semiconductor device that performs a memory control function. In an implementation, when the memory controller 100 corresponds to an AP, the memory controller 100 may include a memory control logic, random access memory (RAM), a central processing unit (CPU), a graphics processing unit (GPU), or a modem.

In response to a read or write request from a host, the memory controller 100 may control the memory device 200 to read data stored in the memory device 200 or write data to the memory device 200. In detail, the memory controller 100 may control the write and read operations of the memory device 200 by providing an address ADD and a command CMD to the memory device 200. Data may be exchanged between the memory controller 100 and the memory device 200 through a plurality of data channels.

The memory controller 100 may access the memory device 200 in response to the request of a host and may communicate with the host by using various protocols. In an implementation, the memory controller 100 may communicate with the host by using an interface protocol, such as a peripheral component interconnect-express (PCI-E) protocol, an advanced technology attachment (ATA) protocol, a serial ATA (SATA) protocol, a parallel ATA (PATA) protocol, or a serial attached small computer small interface (SCSI) (SAS) protocol. Besides the above, various interface protocols, such as a universal serial bus (USB) protocol, a multimedia card (MMC) protocol, an enhanced small disk interface (ESDI) protocol, and an integrated drive electronics (IDE) protocol, may be used as protocols between the host and the memory controller 100.

The memory device 200 may include a volatile memory device. The volatile memory device may include RAM, dynamic RAM (DRAM), or static RAM (SRAM). In an implementation, the memory device 200 may include double data rate (DDR) synchronous dynamic random-access memory (SDRAM), low-power DDR (LPDDR) SDRAM, graphics DDR (GDDR) SDRAM, or Rambus DRAM (RDRAM). The memory device 200 may include high-bandwidth memory (HBM).

Alternatively, the memory device 200 may include a non-volatile memory device. In an implementation, the memory device 200 may include resistive-type memory, such as magnetoresistive RAM (MRAM), ferroelectric RAM (FeRAM), phase-change RAM (PRAM), or resistive RAM (ReRAM).

Each of the memory controller 100 and the memory device 200 may include a transmitter circuit. FIG. 1 illustrates the case where the memory controller 100 includes a first transmitter circuit 110 and the memory device 200 includes a second transmitter circuit 210. The first transmitter circuit 110 may transmit write data to the memory device 200, and the second transmitter circuit 210 may transmit read data to the memory controller 100. The memory controller 100 and the memory device 200 may exchange data in parallel through a plurality of data channels. Each of the memory controller 100 and the memory device 200 may include a plurality of transmitters corresponding to the data channels. In an implementation, FIG. 1 illustrates the case where the first transmitter circuit 110 includes first to M-th transmitters 111_1 to 111_M, and the second transmitter circuit 210 includes first to M-th transmitters 211_1 to 211_M. In an implementation, the first transmitter circuit 110 may include a different number of transmitters than the second transmitter circuit 210.

The memory device 200 may further include a memory cell array 220, a multi-phase clock generator 230, and a control logic 240. The multi-phase clock generator 230 may generate multiple clock signals having different phases from each other (e.g., a multi-phase clock signal) by using a clock signal CLK provided from the memory controller 100 and synchronize the multi-phase clock signal with the operation of the memory system 10. In an implementation, the memory device 200 may receive or transmit data by using a multi-phase clock signal having a lower frequency than the clock signal CLK. Accordingly, because data may be exchanged based on a clock having a lower frequency than the clock signal CLK, data exchange may be reliably performed.

In an implementation, when the multi-phase clock generator 230 generates a 4-phase clock signal, the 4-phase clock signal may include first to fourth clock signals respectively having phase differences of 0 degrees, 90 degrees, 180 degrees, and 270 degrees from the clock signal CLK. The first to fourth clock signals may be defined as having a phase difference of 90 degrees sequentially from each other, regardless of the phase of the clock signal CLK. In an embodiment, the 4-phase clock signal may have a frequency that is half the frequency of the clock signal CLK and may be generated in synchronization with a rising edge and a falling edge of each of two clocks of the clock signal CLK. The multi-phase clock generator 230 may include a clock tree that generates the 4-phase clock signal based on the clock signal CLK.

The control logic 240 may generally control the internal operations of the memory device 200. In an implementation, the control logic 240 may control the clock signal generation of the multi-phase clock generator 230. In an embodiment, the control logic 240 may generally control the operations of the second transmitter circuit 210 or provide at least one control signal for the second transmitter circuit 210 to perform a data output operation according to embodiments.

Each of the first to M-th transmitters 111_1 to 111_M of the first transmitter circuit 110 and each of the first to M-th transmitters 211_1 to 211_M of the second transmitter circuit 210 may receive pieces of data (or data bits) D in parallel and sequentially output the pieces of data D one-by-one. Accordingly, each transmitter may convert parallel data into serial data and thus be referred to as a serializer.

In an embodiment, each of the first to M-th transmitters 211_1 to 211_M of the second transmitter circuit 210 may output pieces of data in synchronization with a multi-phase clock signal. In the embodiments described below, it is assumed that the multi-phase clock signal includes first to fourth clock signals CK1 to CK4 (or CK [1:4]) corresponding to a 4-phase clock signal.

In an example of the operation of the first transmitter 211_1 of the memory device 200, the first transmitter 211_1 may receive the first to fourth clock signals CK1 to CK4, which have a phase difference of 90 degrees sequentially from each other, and first to fourth data D1 to D4 (or D [1:4]), as the pieces of data D, in parallel. The first transmitter 211_1 may sequentially output the first to fourth data D1 to D4 at respectively edge timings of the first to fourth clock signals CK1 to CK4.

The first transmitter 211_1 may include at least one driver to output the first to fourth data D1 to D4. The driver may be connected to a data channel and may output data as logic high or logic low by pulling up or down a data output node. In an embodiment, the first transmitter 211_1 may include fewer drivers than the first to fourth data D1 to D4. In an implementation, a driver may be provided in correspondence to two pieces of data. Accordingly, the number of drivers acting as a load on the data output node may be reduced, and the speed of outputting data through the data output node may be increased.

In an embodiment, the first transmitter 211_1 may include a plurality of data selectors in a front-end stage during data signal processing. Each data selector may perform a logical operation on the first to fourth clock signals CK1 to CK4 and data and output a plurality of data selection signals. According to a bit value of data provided to the first transmitter 211_1, at least some of the data selection signals may be maintained at a certain level without toggling, and accordingly, power that is consumed when the first transmitter 211_1 outputs the first to fourth data D1 to D4 may be reduced. In other words, when the data selectors are provided at the front-end stage in an embodiment, internal signals that do not toggle during signal processing may be output from the front-end stage, and accordingly, power consumption may be reduced.

According to an embodiment, the memory device 200 may generate a multi-phase clock signal by using various signals from the memory controller 100. In an embodiment, the memory device 200 may generate a multi-phase clock signal by using a write clock WCK defined in LPDDRx specifications, such as LPDDR5 and LPDDR6, or GDDR specifications.

In the embodiments described above, the operations of a transmitter of the memory device 200 are described, but the embodiments may also be applied to a transmitter of the memory controller 100. In an implementation, the memory controller 100 may generate a multi-phase clock signal, and each transmitter of the first transmitter circuit 110 may sequentially output pieces of data in synchronization with the multi-phase clock signal. Each transmitter of the first transmitter circuit 110 may include fewer drivers than the number of pieces of data input to the transmitter in parallel. Each driver may sequentially output at least two pieces of data.

Figure 2A:
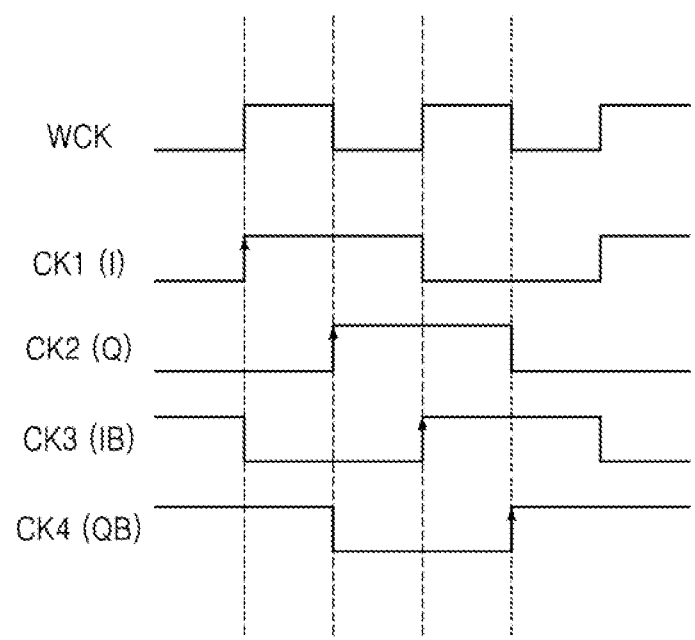
FIGS. 2A and 2B are diagrams showing generation of a 4-phase clock signal and a data output operation.
Figure 2B:
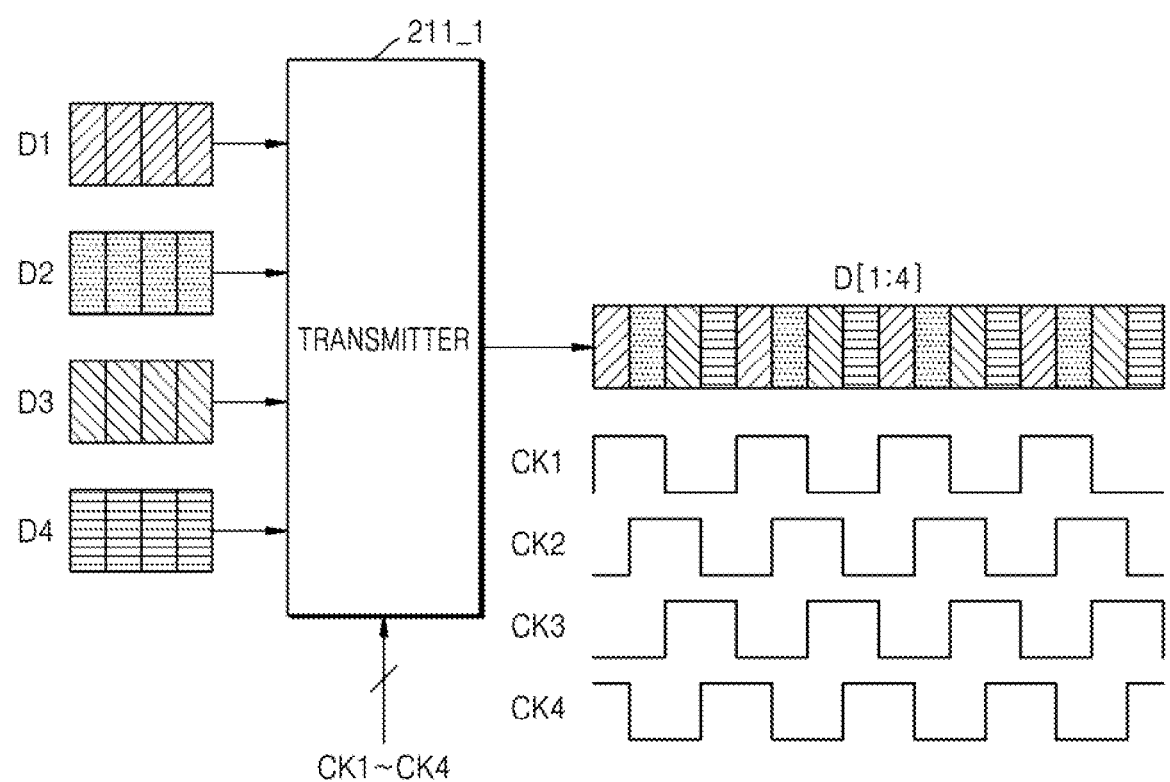

FIGS. 2A and 2B are diagrams showing generation of a 4-phase clock signal and a data output operation. FIG. 2A shows the case where a memory device receives the write clock WCK from a memory controller and a 4-phase clock signal is generated based on the write clock WCK.

The 4-phase clock signal may include the first to fourth clock signals CK1 to CK4 (I, Q, IB, and QB). The first to fourth clock signals CK1 to CK4 may be generated in synchronization with rising and falling edges, respectively, of two clocks of the write clock WCK. In an implementation, the first clock signal CK1 may be generated in synchronization with the rising edge of the first clock cycle of the write clock WCK, the second clock signal CK2 may be generated in synchronization with the falling edge of the first clock cycle of the write clock WCK, the third clock signal CK3 may be generated in synchronization with the rising edge of the second clock cycle of the write clock WCK, and the fourth clock signal CK4 may be generated in synchronization with the falling edge of the second clock cycle of the write clock WCK.

The first to fourth clock signals CK1 to CK4 may have a frequency that is half the frequency of the write clock WCK. The first transmitter 211_1 may output the first data D1 at an edge timing of the first clock signal CK1, the second data D2 at an edge timing of the second clock signal CK2, the third data D3 at an edge timing of the third clock signal CK3, and the fourth data D4 at an edge timing of the fourth clock signal CK4.

Referring to FIG. 2B, the first transmitter 211_1 may receive the first to fourth data D1 to D4 in parallel and sequentially output the first to fourth data D1 to D4 based on a logical operation on the first to fourth clock signals CK1 to CK4 and the bit values of the first to fourth data D1 to D4. FIG. 2B illustrates the case where the duty ratio of each of the first to fourth clock signals CK1 to CK4 is 50% and the first to fourth data D1 to D4 are output in synchronization with the respective edge timings of the first to fourth clock signals CK1 to CK4.

FIG. 2B illustrates the case where the duty ratio of each of the first to fourth clock signals CK1 to CK4 is 50%. In an implementation, the duty ratio of each of the first to fourth clock signals CK1 to CK4 may be less than 50% or may be determined such that the respective logic high periods of the first to fourth clock signals CK1 to CK4 do not overlap with one another.

Figure 3:
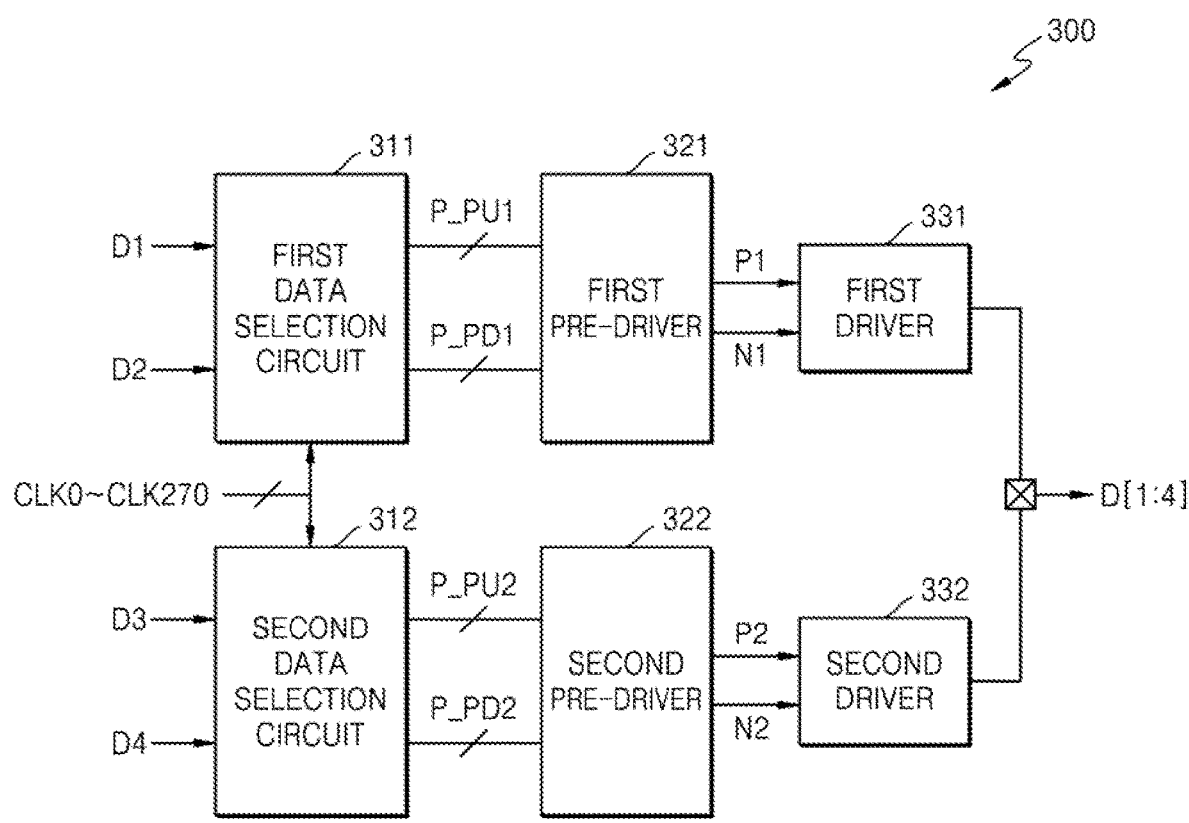
FIG. 3 is a block diagram showing an example embodiment of a transmitter.

FIG. 3 is a block diagram showing an example embodiment of a transmitter. FIG. 3 shows components of a single transmitter 300. A memory controller or a memory device may include a plurality of transmitters 300 of FIG. 3. For convenience of description, first to fourth clock signals are respectively denoted by CLK0, CLK90, CLK180, and CLK270 in FIG. 3 to indicate the respective phases of the first to fourth clock signals CK1 to CK4.

Referring to FIG. 3, the transmitter 300 may include a plurality of stages performing signal processing in correspondence to a plurality of pieces of data (e.g., the first to fourth data D1 to D4), respectively. The stages may include a stage performing a logical operation on the first to fourth data D1 to D4 and the first to fourth clock signals CLK0, CLK90, CLK180, and CLK270, a stage controlling the driving of a pull-up signal and a pull-down signal based on data selection signals resulting from the logical operation, and a state outputting data by pulling up and down a data output node in response to the pull-up signal and the pull-down signal.

In an embodiment, the transmitter 300 may include a first data selection circuit 311 and a second data selection circuit 312 in correspondence to the first to fourth data D1 to D4. The transmitter 300 may further include a first pre-driver 321 and a first driver 331 in correspondence to the first data selection circuit 311. The transmitter 300 may further include a second pre-driver 322 and a second driver 332 in correspondence to the second data selection circuit 312.

The transmitter 300 may include a plurality of logic elements in relation to a data selection operation. The logic elements may be classified into the first data selection circuit 311 and the second data selection circuit 312. In the embodiment of FIG. 3, a plurality of logic elements may be classified into two data selection circuits. In an implementation, the transmitter 300 may include first to fourth data selection circuits corresponding to the first to fourth data D1 to D4.

The first data selection circuit 311 may receive the first data D1 and the second data D2, generate data selection signals based on the bit values of the first data D1 and the second data D2 and the first to fourth clock signals CLK0, CLK90, CLK180, and CLK270, and output the data selection signals through a first pull-up path P_PU1 and a first pull-down path P_PD1. In an implementation, according to a result of performing a logical operation on the bit values of the first data D1 and the second data D2 and the first to fourth clock signals CLK0, CLK90, CLK180, and CLK270, the first data selection circuit 311 may output data selection signals according to the bit value of the first data D1 at an edge timing of the first clock signal CLK0 and may output data selection signals according to the bit value of the second data D2 at an edge timing of the second clock signal CLK90.

When the bit value of the first data D1 is logic high at the edge timing of the first clock signal CLK0, the first data selection circuit 311 may output a data selection signal, which toggles or may be activated, through the first pull-up path P_PU1 and a data selection signal, which does not toggle or may be inactivated, through the first pull-down path P_PD1. When the bit value of the first data D1 is logic low at the edge timing of the first clock signal CLK0, the first data selection circuit 311 may output a non-toggling data selection signal through the first pull-up path P_PU1 and a toggling data selection signal through the first pull-down path P_PD1.

Similarly, when the bit value of the second data D2 is logic high at the edge timing of the second clock signal CLK90, the first data selection circuit 311 may output a toggling data selection signal through the first pull-up path P_PU1 and a non-toggling data selection signal through the first pull-down path P_PD1. When the bit value of the second data D2 is logic low at the edge timing of the second clock signal CLK90, the first data selection circuit 311 may output a non-toggling data selection signal through the first pull-up path P_PU1 and a toggling data selection signal through the first pull-down path P_PD1.

In other words, because some of a plurality of data selection signals output from the first data selection circuit 311 do not toggle, power consumption may be reduced compared to the case where a plurality of data selection signals toggle. In addition, because the number of drivers provided in correspondence to the first to fourth data D1 to D4 in a data output node may be reduced by half, the number of drivers acting as a load on the data output node may be reduced, which may improve data output characteristics.

Similarly, when the bit value of the third data D3 is logic high at the edge timing of the third clock signal CLK180, the second data selection circuit 312 may output a toggling data selection signal through a second pull-up path P_PU2 and a non-toggling data selection signal through a second pull-down path P_PD2. When the bit value of the third data D3 is logic low at the edge timing of the third clock signal CLK180, the second data selection circuit 312 may output a non-toggling data selection signal through the second pull-up path P_PU2 and a toggling data selection signal through the second pull-down path P_PD2.

When the bit value of the fourth data D4 is logic high at the edge timing of the fourth clock signal CLK270, the second data selection circuit 312 may output a toggling data selection signal through the second pull-up path P_PU2 and a non-toggling data selection signal through the second pull-down path P_PD2. When the bit value of the fourth data D4 is logic low at the edge timing of the fourth clock signal CLK270, the second data selection circuit 312 may output a non-toggling data selection signal through the second pull-up path P_PU2 and a toggling data selection signal through the second pull-down path P_PD2.

In response to a data selection signal through the first pull-up path P_PU1, the first pre-driver 321 may output a first pull-up signal P1 for controlling a pull-up circuit of the first driver 331. In response to a data selection signal through the first pull-down path P_PD1, the first pre-driver 321 may output a first pull-down signal N1 for controlling a pull-down circuit of the first driver 331. The first driver 331 may output the first data D1 or the second data D2 in response to the first pull-up signal P1 and the first pull-down signal N1. In an implementation, the first driver 331 may output the first data D1 at the edge timing of the first clock signal CLK0 and the second data D2 at the edge timing of the second clock signal CLK90.

Similarly, in response to a data selection signal through the second pull-up path P_PU2, the second pre-driver 322 may output a second pull-up signal P2 for controlling a pull-up circuit of the second driver 332. In response to a data selection signal through the second pull-down path P_PD2, the second pre-driver 322 may output a second pull-down signal N2 for controlling a pull-down circuit of the second driver 332. The second driver 332 may output the third data D3 or the fourth data D4 in response to the second pull-up signal P2 and the second pull-down signal N2. In an implementation, the second driver 332 may output the third data D3 at the edge timing of the third clock signal CLK180 and the fourth data D4 at the edge timing of the fourth clock signal CLK270.

Figure 4:
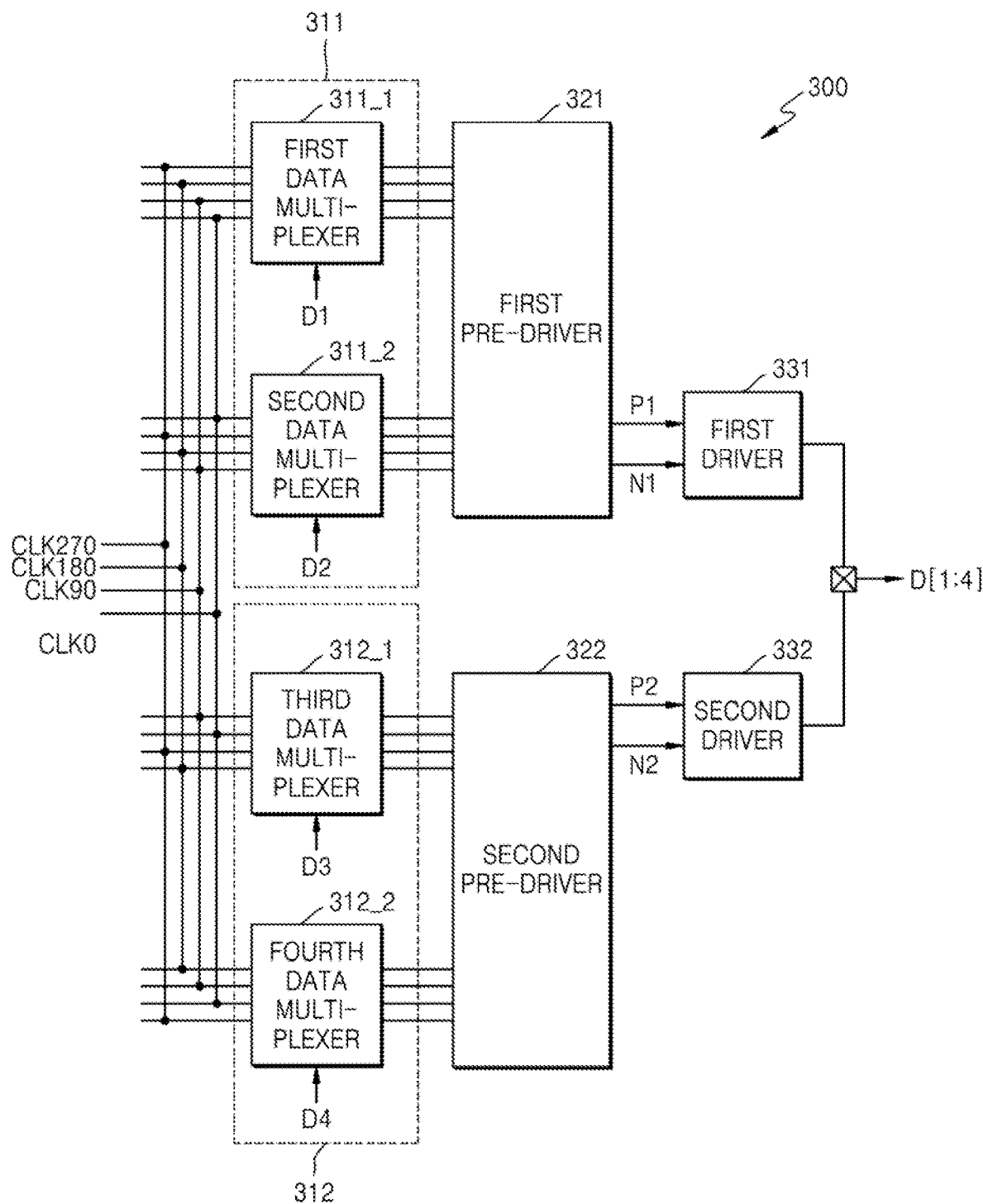
FIG. 4 is a block diagram showing an example embodiment of the transmitter of FIG. 3.

FIG. 4 is a block diagram showing an example embodiment of the transmitter 300 of FIG. 3. Referring to FIG. 4, the first data selection circuit 311 may include a first data multiplexer 311_1 and a second data multiplexer 311_2, and the second data selection circuit 312 may include a third data multiplexer 312_1 and a fourth data multiplexer 312_2. The first to fourth clock signals CLK0, CLK90, CLK180, and CLK270 may be provided in common to the first to fourth data multiplexers 311_1, 311_2, 312_1, and 312_2. In an embodiment, each of the first to fourth data multiplexers 311_1, 311_2, 312_1, and 312_2 may be referred to as a data selector.

The first data multiplexer 311_1 may include a plurality of logic elements to process a logical operation on the first data D1 and the first to fourth clock signals CLK0, CLK90, CLK180, and CLK270 and output at least four data selection signals. FIG. 4 illustrates the case where each data multiplexer outputs four data selection signals. In an implementation, the number of data selection signals output from each data multiplexer may vary with logic elements included in the data multiplexer.

Each data multiplexer may generate a data selection signal output through a pull-up path and a data selection signal output through a pull-down path. In an implementation, the first data multiplexer 311_1 may output two data selection signals through the first pull-up path P_PU1 and two data selection signals through the first pull-down path P_PD1. As described above, some of four data selection signals output from each data multiplexer may be inactivated according to the logic states of the bit value of the first data D1 and the first to fourth clock signals CLK0, CLK90, CLK180, and CLK270.

Similarly, the second data multiplexer 311_2 may include a plurality of logic elements to process a logical operation on the second data D2 and the first to fourth clock signals CLK0, CLK90, CLK180, and CLK270, the third data multiplexer 312_1 may include a plurality of logic elements to process a logical operation on the third data D3 and the first to fourth clock signals CLK0, CLK90, CLK180, and CLK270, and the fourth data multiplexer 312_2 may include a plurality of logic elements to process a logical operation on the fourth data D4 and the first to fourth clock signals CLK0, CLK90, CLK180, and CLK270.

The first pre-driver 321 may output the first pull-up signal P1 for controlling a pull-up circuit of the first driver 331 and the first pull-down signal N1 for controlling a pull-down circuit of the first driver 331, based on data selection signals from the first data multiplexer 311_1 and data selection signals from the second data multiplexer 311_2. The second pre-driver 322 may output the second pull-up signal P2 for controlling a pull-up circuit of the second driver 332 and the second pull-down signal N2 for controlling a pull-down circuit of the second driver 332, based on data selection signals from the third data multiplexer 312_1 and data selection signals from the fourth data multiplexer 312_2. The first driver 331 and the second driver 332 may sequentially output the first to fourth data D1 to D4.

Figure 5:
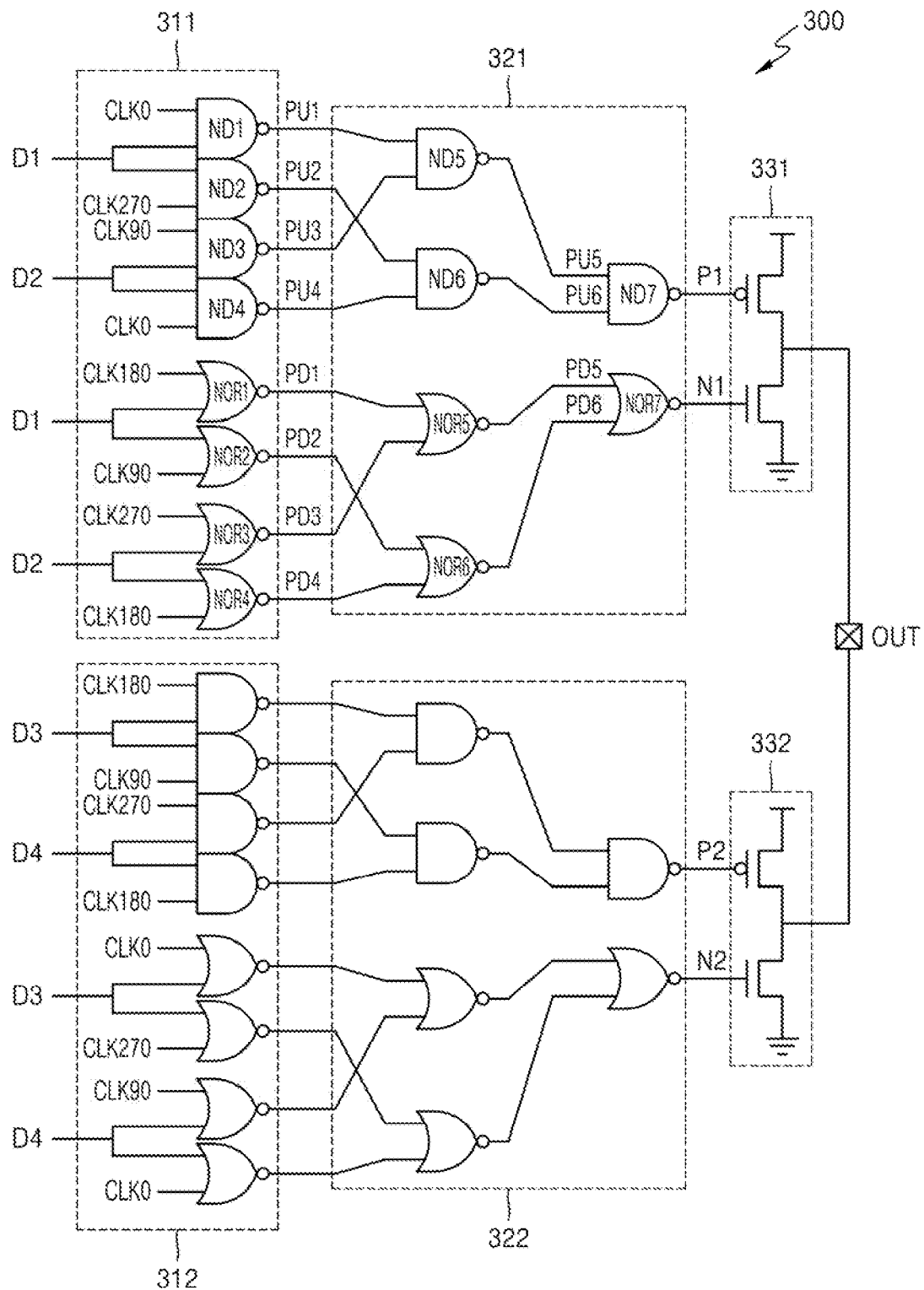
FIG. 5 is a circuit diagram showing an example embodiment of the transmitter of FIG. 4.

FIG. 5 is a circuit diagram showing an example embodiment of the transmitter 300 of FIG. 4. For convenience of illustration, logic elements of each of the first to fourth data multiplexers 311_1, 311_2, 312_1, and 312_2 are not adjacent to each other in FIG. 5. For convenience of illustration, the route of data provided to a pull-up path is separate from the route of data provided to a pull-down path in FIG. 5. However, e.g., the first data D1 may be provided to the pull-up path and the pull-down path through a common route.

The logic elements in FIG. 5 may form various types of components. In an implementation, first and second NAND elements ND1 and ND2 and first and second NOR elements NOR1 and NOR2 in FIG. 5 may form the first data multiplexer 311_1 described above, and third and fourth NAND elements ND3 and ND4 and third and fourth NOR elements NOR3 and NOR4 in FIG. 5 may form the second data multiplexer 311_2.

As shown in FIG. 5, the first and second NAND elements ND1 and ND2 may perform a NAND operation on the first data D1 and the first and fourth clock signals CLK0 and CLK270 and output a data selection signal, which results from the NAND operation, through a first pull-up path. In an implementation, data selection signals resulting from the operations of the first and second NAND elements ND1 and ND2 may be output through first and second pull-up lines PU1 and PU2 of the first pull-up path.

The first and second NOR elements NOR1 and NOR2 may perform a NOR operation on the first data D1 and the second and third clock signals CLK90 and CLK180 and output a data selection signal, which results from the NOR operation, through a first pull-down path. In an implementation, data selection signals resulting from the operations of the first and second NOR elements NOR1 and NOR2 may be output through first and second pull-down lines PD1 and PD2 of the first pull-down path.

The third and fourth NAND elements ND3 and ND4 may perform a NAND operation on the second data D2 and the first and second clock signals CLK0 and CLK90 and output a data selection signal, which results from the NAND operation, through the first pull-up path. In an implementation, data selection signals resulting from the operations of the third and fourth NAND elements ND3 and ND4 may be output through third and fourth pull-up lines PU3 and PU4 of the first pull-up path.

The third and fourth NOR elements NOR3 and NOR4 may perform a NOR operation on the second data D2 and one of the third and fourth clock signals CLK180 and CLK270 and output a data selection signal, which results from the NOR operation, through the first pull-down path. In an implementation, data selection signals resulting from the operations of the third and fourth NOR elements NOR3 and NOR4 may be output through third and fourth pull-down lines PD3 and PD4 of the first pull-down path.

The first pre-driver 321 may include at least one logic element. In an implementation, the first pre-driver 321 may include fifth to seventh NAND elements ND5 to ND7 and fifth to seventh NOR elements NOR5 to NOR7. The fifth to seventh NAND elements ND5 to ND7 of the first pre-driver 321 may output a pull-up signal and thus be referred to as a pull-up controller, and the fifth to seventh NOR elements NOR5 to NOR7 may output a pull-down signal and thus be referred to as a pull-down controller.

Each of the fifth and sixth NAND elements ND5 and ND6 may perform a NAND operation on data selection signals provided through the pull-up path based on the respective bit values of first data D1 and the second data D2. The seventh NAND element ND7 may output the first pull-up signal P1 for controlling a pull-up circuit of the first driver 331 based on results PU5, PU6 of the operations of the fifth and sixth NAND elements ND5 and ND6. Each of the fifth and sixth NOR elements NOR5 and NOR6 may perform a NOR operation on data selection signals provided through the pull-down path based on the respective bit values of first data D1 and the second data D2. The seventh NOR element NOR7 may output the first pull-down signal N1 for controlling a pull-down circuit of the first driver 331 based on results PD5, PD6 of the operations of the fifth and sixth NOR elements NOR5 and NOR6. The first driver 331 may include at least one P-channel metal-oxide semiconductor (PMOS) transistor, which forms the pull-up circuit, and at least one N-channel MOS (NMOS) transistor, which forms the pull-down circuit, and may output data through an output pad OUT.

An example of classifying a plurality of logic elements into a data multiplexer, a pre-driver, and a driver has been described in the embodiment of FIG. 5. In an implementation, the fifth and sixth NAND elements ND5 and ND6 may be classified to be included in the data multiplexer, or the seventh NAND element ND7 may be classified to be included in the driver. FIG. 5 illustrates the case where a transmitter is implemented by using NAND elements and NOR elements.

Figure 6:
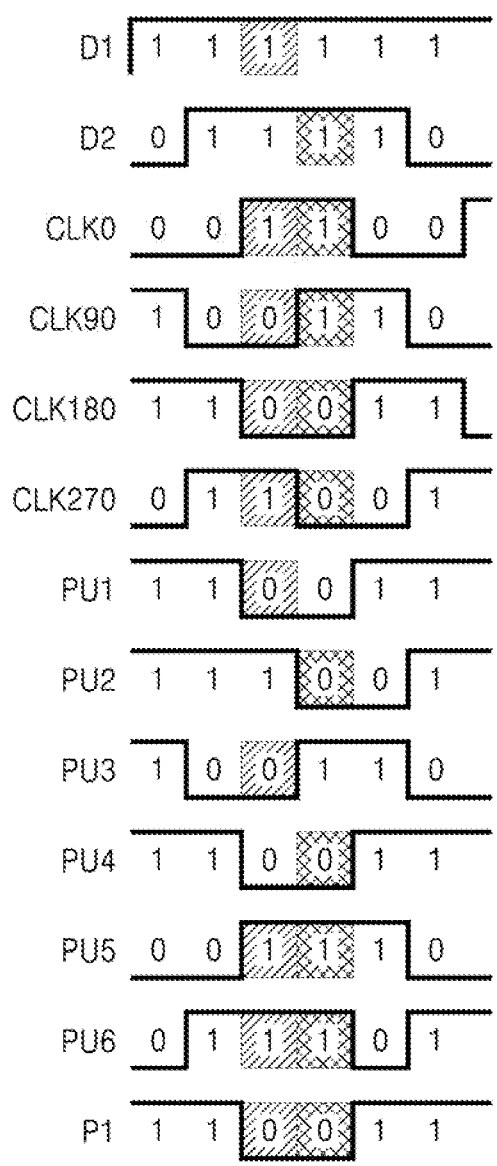
FIGS. 6 to 9 are waveform diagrams showing various signals processed by the transmitter of FIG. 5.
Figure 7:
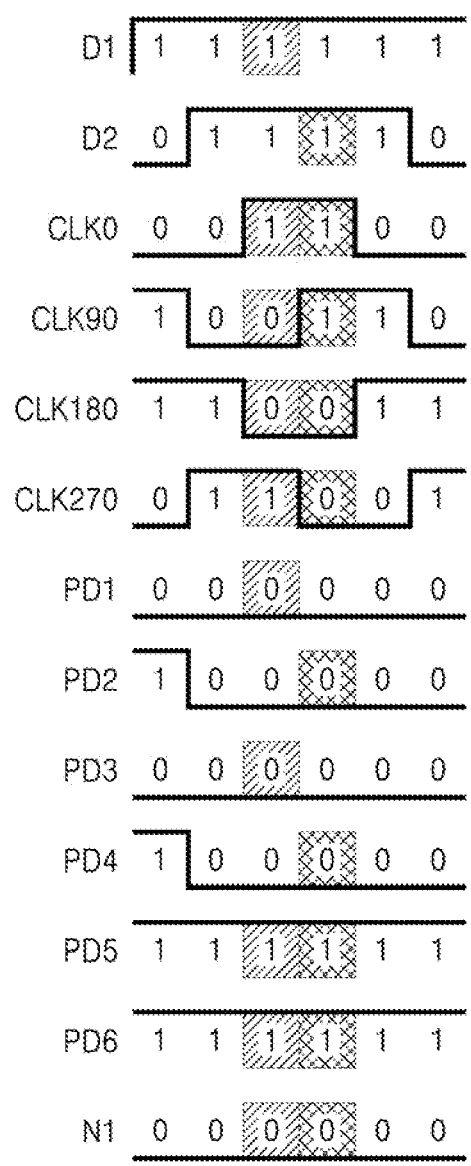

Specific example operation of the transmitter 300 of FIG. 5 may be described with reference to FIGS. 6 and 7 below. FIGS. 6 and 7 are waveform diagrams showing various signals processed by the transmitter 300 of FIG. 5. In an implementation, FIG. 6 shows waveforms of signals in a pull-up path, and FIG. 7 shows waveforms of signals in a pull-down path.

Referring to FIGS. 5 and 6, the first data D1 may be output at the edge timing of the first clock signal CLK0, and the second data D2 may be output at the edge timing of the second clock signal CLK90. FIG. 6 illustrates the case where the bit value of the first data D1 at the edge timing of the first clock signal CLK0 is "1" and the bit value of the second data D2 at the edge timing of the second clock signal CLK90 is "1".

A result of performing a NAND operation on the first data D1 and the first clock signal CLK0 may be output to the first pull-up line PU1 of the pull-up path. As the bit value of the first data D1 is "1", the data selection signal of the first pull-up line PU1 may have an inverted value of the logic state of the first clock signal CLK0. At this time, because the logic state of the first clock signal CLK0 at the edge timing of the first clock signal CLK0 has a value of "1", the logic state of the data selection signal of the first pull-up line PU1 may have a value of "0".

Based on the operations of the logic elements in FIG. 5, at the edge timing of the first clock signal CLK0, the logic state of the data selection signal of the second pull-up line PU2 may have a value of "1", the logic state of the data selection signal of the third pull-up line PU3 may have a value of "0", and the logic state of the data selection signal of the fourth pull-up line PU4 may have a value of "0". Accordingly, a value of "00" may be provided as an input of the fifth NAND element ND5, a value of "10" may be provided as an input of the sixth NAND element ND6, and a value of "11" may be provided as an input of the seventh NAND element ND7.

The seventh NAND element ND7 may perform a NAND operation on an output of the fifth NAND element ND5 and an output of the sixth NAND element ND6 and thus output the first pull-up signal P1. According to the operations described above, the first pull-up signal P1 may be in a logic low state at the edge timing of the first clock signal CLK0, the pull-up circuit of the first driver 331 may be turned on, and the first data D1 having a logic high bit value may be output.

At the edge timing of the second clock signal CLK90, the bit value of the second data D2 may be "1", the logic state of the first clock signal CLK0 and the logic state of the second clock signal CLK90 may have a value of "1", and the logic state of the third clock signal CLK180 and the logic state of the fourth clock signal CLK270 may have a value of "0".

At the edge timing of the second clock signal CLK90, according to the operations of the first to fourth NAND elements ND1 to ND4, the logic state of a data selection signal of the first pull-up line PU1 may have a value of "0", the logic state of a data selection signal of the second pull-up line PU2 may have a value of "0", the logic state of a data selection signal of the third pull-up line PU3 may have a value of "1", and the logic state of a data selection signal of the fourth pull-up line PU4 may have a value of "0". Accordingly, a value of "01" may be provided as an input of the fifth NAND element ND5, and a value of "00" may be provided as an input of the sixth NAND element ND6. A value of "11" may be provided as an input of the seventh NAND element ND7. The seventh NAND element ND7 may output the first pull-up signal P1 in a logic low state at the edge timing of the second clock signal CLK90. Accordingly, the pull-up circuit of the first driver 331 may be turned on, and the second data D2 having a logic high bit value may be output.

Under the same data condition as that in FIG. 6, operations related to a pull-down path of a transmitter are described with reference to FIG. 7 below. In a first pull-down path, the output of the first NOR element NOR1 may be transmitted to the first pull-down line PD1, the output of the second NOR element NOR2 may be transmitted to the second pull-down line PD2, the output of the third NOR element NOR3 may be transmitted to the third pull-down line PD3, and the output of the fourth NOR element NOR4 may be transmitted to the fourth pull-down line PD4. At the edge timing of the first clock signal CLK0, the bit value of the first data D1 may be "1" and the logic state of the third clock signal CLK180 may have a value of "0", and accordingly, the logic state of a data selection signal of the first pull-down line PD1 may have a value of "0".

According to the operation results of the second to fourth NOR elements NOR2 to NOR4, the logic states of respective data selection signals of the second pull-down line PD2, the third pull-down line PD3, and the fourth pull-down line PD4 may all have a value of "0". Accordingly, signals in a logic high state may be transmitted to the fifth pull-down line PD5 and the sixth pull-down line PD6, and the seventh NOR element NOR7 may output the first pull-down signal N1 in a logic low state. Accordingly, the pull-down circuit of the first driver 331 may be turned off by the first pull-down signal N1, and the first driver 331 may output the first data D1 having a logic high bit value.

Similarly, at the edge timing of the second clock signal CLK90, the second data D2 may be output. A plurality of data selection signals may be provided through the pull-down path. According to the operation results of the first to seventh NOR elements NOR1 to NOR7, the seventh NOR element NOR7 may output the first pull-down signal N1 in a logic low state. Accordingly, the pull-down circuit of the first driver 331 may be turned off by the first pull-down signal N1, and the first driver 331 may output the second data D2 having a logic high bit value at the edge timing of the second clock signal CLK90.

Figure 8:
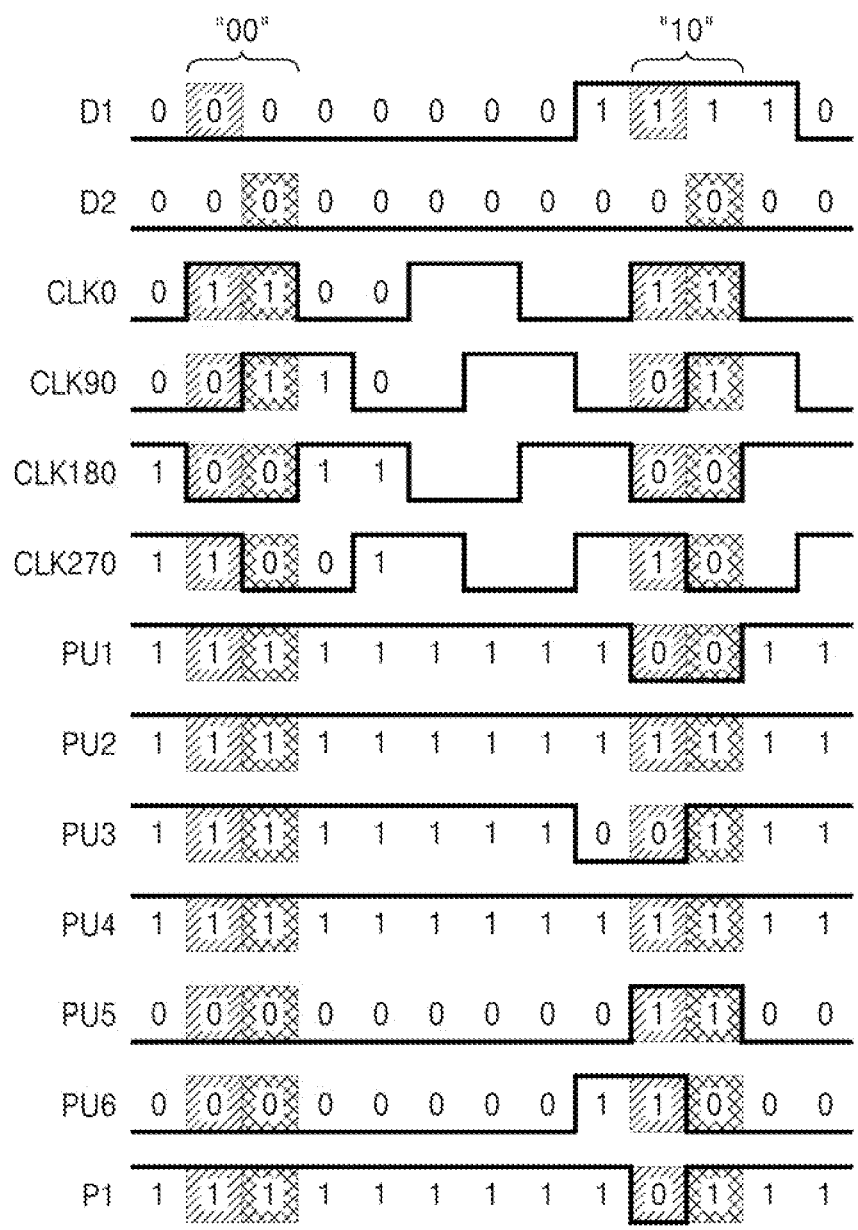
Figure 9:
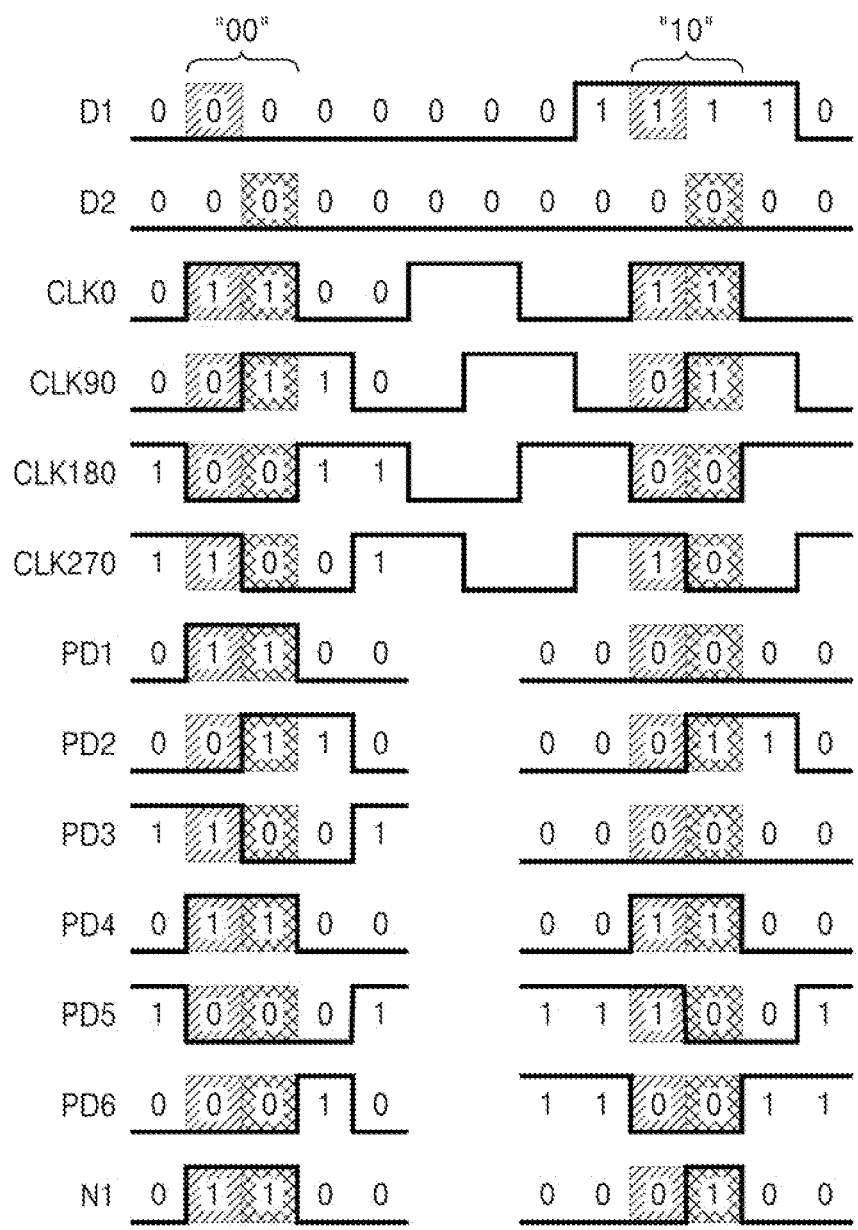

FIGS. 8 and 9 are waveforms of examples of various signals processed by the transmitter 300 of FIG. 5. FIG. 8 shows the waveforms of signals in a pull-up path, and FIG. 9 shows the waveforms of signals in a pull-down path. FIGS. 8 and 9 illustrate the cases where bit values of the first data D1 and the second data D2 are "00" and "10".

Referring to FIG. 8, the first data D1 having a bit value of "0" may be output at the edge timing of the first clock signal CLK0, and the second data D2 having a bit value of "0" may be output at the edge timing of the second clock signal CLK90. At the edge timing of the first clock signal CLK0, data selection signals in a logic state of "1" may be respectively transmitted to the first to fourth pull-up lines PU1 to PU4, according to the NAND operation results shown in FIG. 5. In addition, a value of "00" may be provided to an input of the seventh NAND element ND7. According to the operation result of the seventh NAND element ND7, the first pull-up signal P1 may be in a logic high state, and the pull-up circuit of the first driver 331 may be turned off.

Similarly, at the edge timing of the second clock signal CLK90, data selection signals in a logic state of "1" may be respectively transmitted to the first to fourth pull-up lines PU1 to PU4. Accordingly, the first pull-up signal P1 may be in a logic high state, according to the operation result of the seventh NAND element ND7, and the pull-up circuit of the first driver 331 may be turned off.

Referring to FIG. 9 showing the operation in the pull-down path, at the edge timing of the first clock signal CLK0, data selection signals in a logic state of "1" may be respectively transmitted to the first, third, and fourth pull-down lines PU1, PU3, and PU4, and a data selection signal in a logic state of "0" may be transmitted to the second pull-down line PD2, according to the NOR operation results shown in FIG. 5. According to the operation result of the seventh NOR element NOR7, the first pull-down signal N1 may be in a logic high state, and the pull-down circuit of the first driver 331 may be turned on. According to the operations described with reference to FIGS. 8 and 9, the first driver 331 may output the first data D1 having a bit value of "0" at the edge timing of the first clock signal CLK0.

Similarly, as shown in FIG. 9, the edge timing of the second clock signal CLK90, the first pull-down signal N1 may be in a logic high state according to the operation result of the seventh NOR element NOR7, and the first driver 331 may output the second data D2 having a bit value of "0" at the edge timing of the second clock signal CLK90.

An example operation when a bit value of the first data D1 and the second data D2 is "10" is described with reference to FIGS. 8 and 9 below. Referring to FIG. 8, at the edge timing of the first clock signal CLK0, a value of "11" may be provided to an input of the seventh NAND element ND7. According to the operation result of the seventh NAND element ND7, the first pull-up signal P1 may be in a logic low state, and the pull-up circuit of the first driver 331 may be turned on. Contrarily, referring to FIG. 9, at the edge timing of the first clock signal CLK0, a value of "10" may be provided to an input of the seventh NOR element NOR7. According to the operation result of the seventh NOR element NOR7, the first pull-down signal N1 may be in a logic low state. Accordingly, the pull-down circuit of the first driver 331 may be turned off, and therefore, the first driver 331 may output the first data D1 having a bit value of "1" at the edge timing of the first clock signal CLK0.

Referring to FIG. 8, at the edge timing of the second clock signal CLK90, a value of "10" may be provided to an input of the seventh NAND element ND7. According to the operation result of the seventh NAND element ND7, the first pull-up signal P1 may be in a logic high state, and the pull-up circuit of the first driver 331 may be turned off. Contrarily, referring to FIG. 9, at the edge timing of the second clock signal CLK90, a value of "00" may be provided to an input of the seventh NOR element NOR7. According to the operation result of the seventh NOR element NOR7, the first pull-down signal N1 may be in a logic high state. Accordingly, the pull-down circuit of the first driver 331 may be turned on, and therefore, the first driver 331 may output the second data D2 having a bit value of "0" at the edge timing of the second clock signal CLK90.

Figure 10:
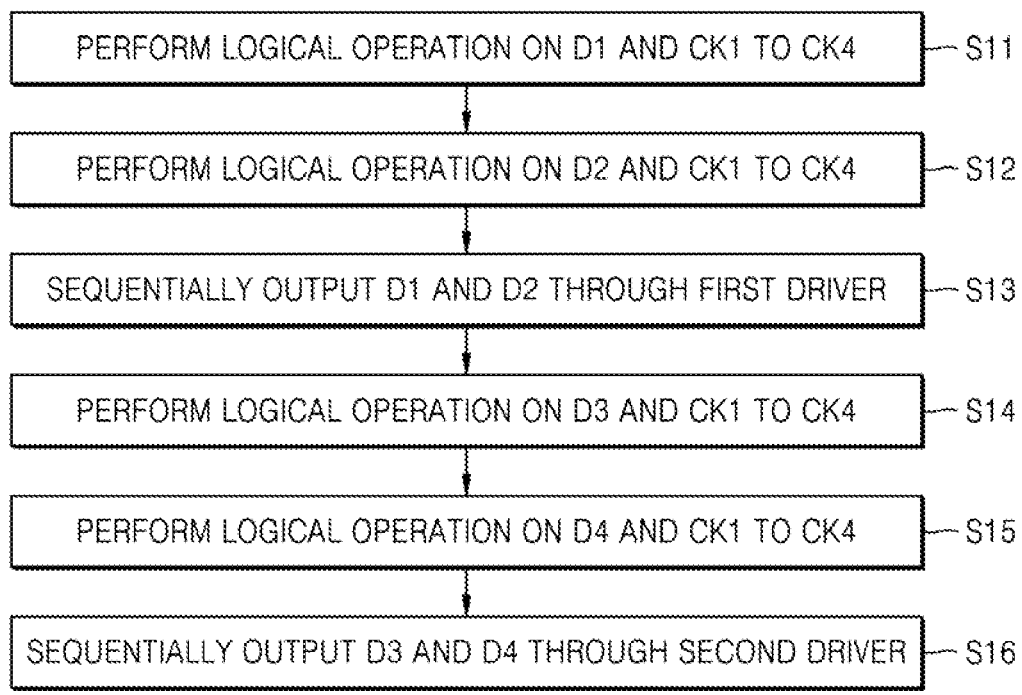
FIG. 10 is a flowchart showing an operating method of a semiconductor device, according to an example embodiment.

FIG. 10 is a flowchart showing an operating method of a semiconductor device, according to an example embodiment. The semiconductor device may include various kinds of semiconductor chips, e.g., a transmitter which receives in parallel a plurality of bits of data and sequentially outputs the pieces of data. The first to fourth data D1 to D4 are used as examples of data having a plurality of bits in FIG. 10, but a transmitter according to embodiments may receive a different number of pieces of data in parallel and sequentially output the pieces of data.

The transmitter of the semiconductor device may perform a logical operation on the first data D1 and the first to fourth clock signals CK1 to CK4, which are received as a multiphase clock signal, in operation S11 and output first data selection signals resulting from the logical operation through a first pull-up path and a first pull-down path. The first data selection signals may include first pull-up data selection signals transmitted through the first pull-up path and first pull-down data selection signals transmitted through the first pull-down path. According to the bit value of the first data D1, when the first pull-up data selection signals toggle, the first pull-down data selection signals may not toggle.

The transmitter may perform a logical operation on the second data D2 and the first to fourth clock signals CK1 to CK4 in operation S12 and output second pull-up data selection signals and second pull-down data selection signals according to a result of the logical operation. The second pull-up data selection signals may be transmitted through the first pull-up path, and the second pull-down data selection signals may be transmitted through the first pull-down path. The transmitter may include a first driver in correspondence to the first data D1 and the second data D2. The transmitter may pull up a data output node in response to a pull-up signal transmitted through the first pull-up path and pull down the data output node in response to a pull-down signal transmitted through the first pull-down path.

The first driver may sequentially output the first data D1 and the second data D2 according to the pull-up signal and the pull-down signal in operation S13. In an implementation, the first driver may output the first data D1 at the edge timing of the first clock signal CK1, according to the result of performing the logical operation on the first data D1 and the first to fourth clock signals CK1 to CK4, and output the second data D2 at the edge timing of the second clock signal CK2, according to the result of performing the logical operation on the second data D2 and the first to fourth clock signals CK1 to CK4.

The transmitter may perform a logical operation on the third data D3 and the first to fourth clock signals CK1 to CK4 in operation S14 and output third pull-up data selection signals and third pull-down data selection signals according to a result of the logical operation. The third pull-up data selection signals may be transmitted through a second pull-up path, and the third pull-down data selection signals may be transmitted through a second pull-down path. The transmitter may perform a logical operation on the fourth data D4 and the first to fourth clock signals CK1 to CK4 in operation S15 and output fourth pull-up data selection signals and fourth pull-down data selection signals according to a result of the logical operation. The fourth pull-up data selection signals may be transmitted through the second pull-up path, and the fourth pull-down data selection signals may be transmitted through the second pull-down path.

The transmitter may include a second driver in correspondence to the third data D3 and the fourth data D4. The second driver may sequentially output the third data D3 and the fourth data D4 according to a pull-up signal and a pull-down signal in operation S16. The second driver may output the third data D3 at the edge timing of the third clock signal CK3 and the fourth data D4 at the edge timing of the fourth clock signal CK4.

Figure 11:
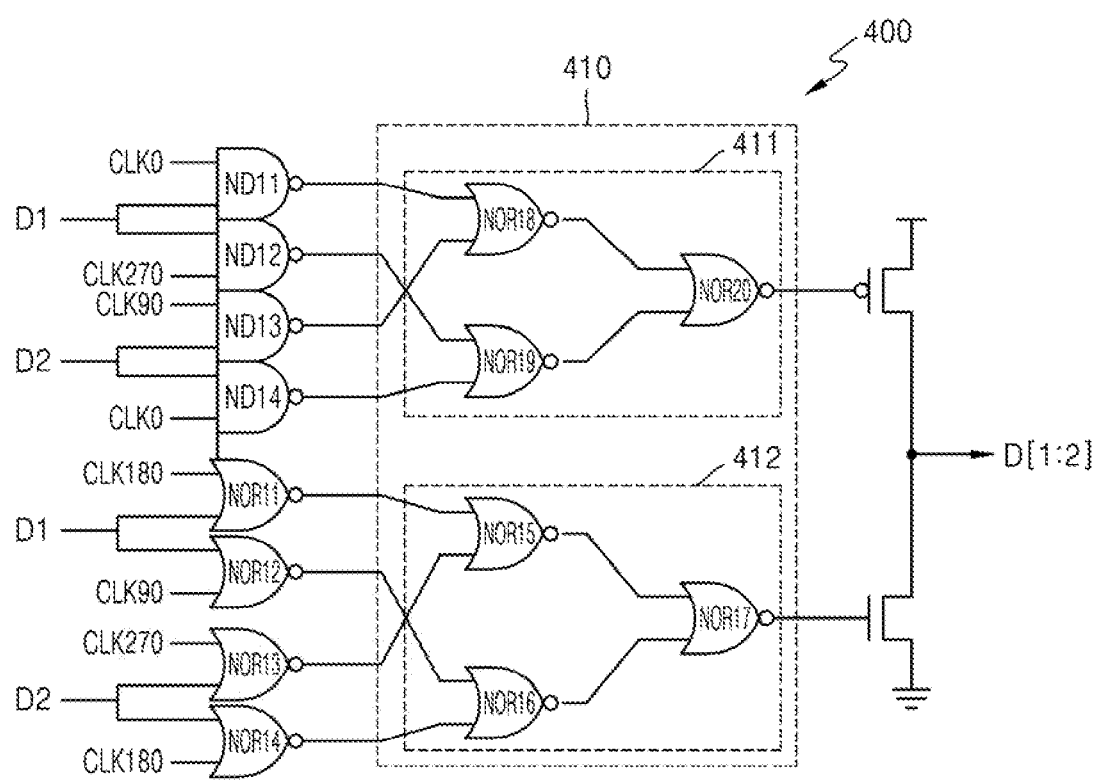
FIG. 11 is a circuit diagram showing an example embodiment of the transmitter of FIG. 4.
Figure 12A:
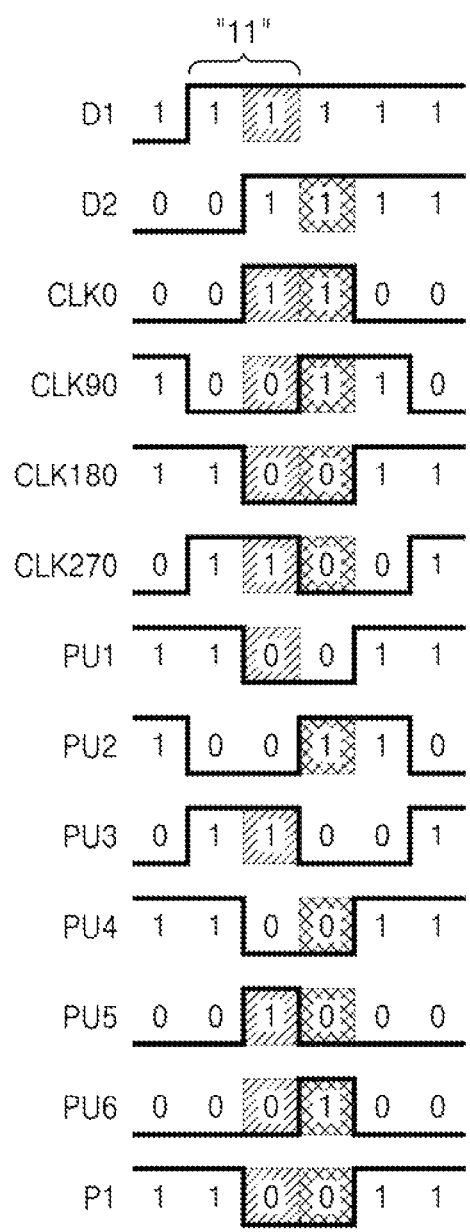
FIGS. 12A to 12B are diagrams showing the operation of a transmitter, according to example embodiments.
Figure 12B:
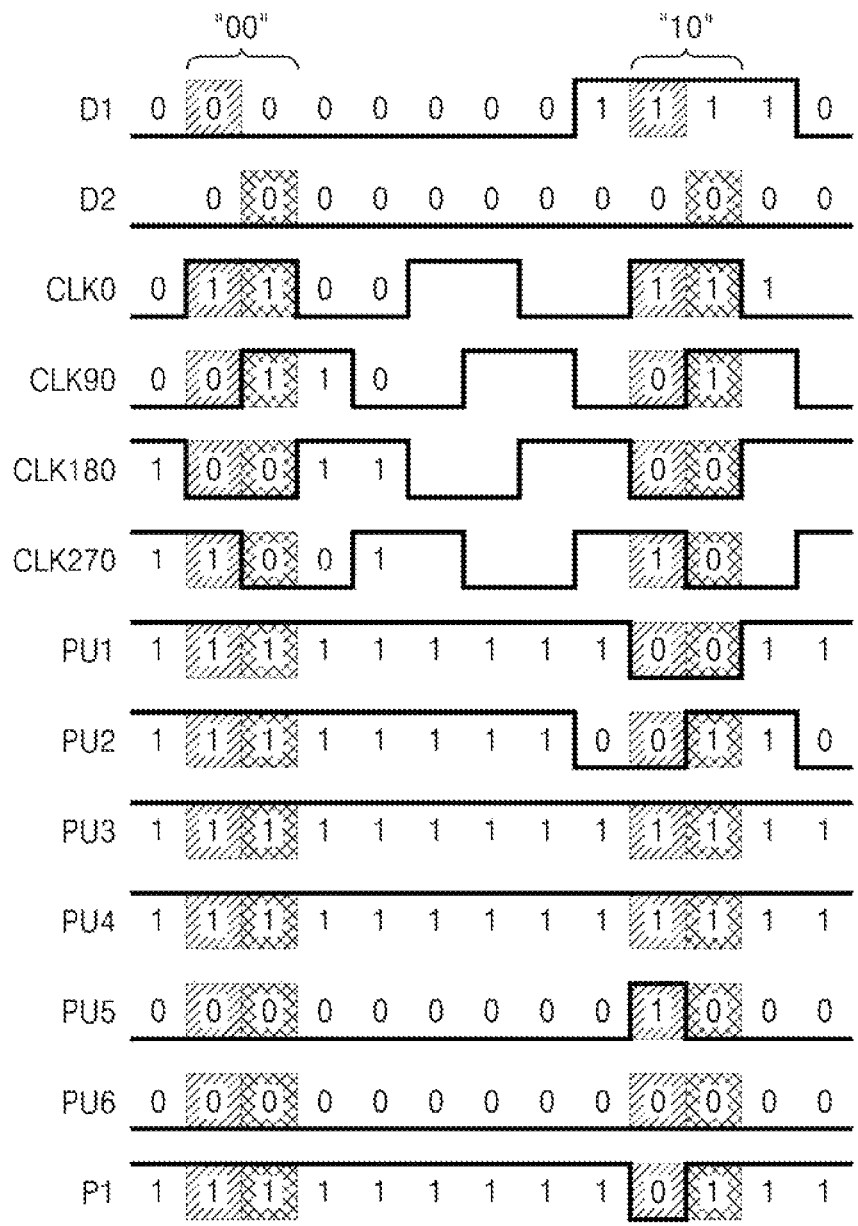

FIG. 11 is a circuit diagram showing an example embodiment of the transmitter of FIG. 4. FIGS. 12A to 12B are diagrams showing the operation of a transmitter, according to example embodiments. For convenience of description, FIG. 11 illustrates only logic elements that are related to the first data D1 and the second data D2 in a transmitter 400.

Referring to FIG. 11, the transmitter 400 may include a plurality of logic elements. The transmitter 400 may include first to fourth NAND elements ND11 to ND14 and eighth to tenth NOR elements NOR18 to NOR20 in relation with a pull-up path. The transmitter 400 may also include first to seventh NOR elements NOR11 to NOR 17 in relation with a pull-down path. In the embodiment of FIG. 11, the transmitter 400 may include a first pre-driver 410 in correspondence to the first data D1 and the second data D2. The first pre-driver 410 may include a pull-up controller 411 including logic elements related to the pull-up path and a pull-down controller 412 including logic elements related to the pull-down path.

In the embodiment of FIG. 11, the first pre-driver 410 may be implemented by using NOR elements. Accordingly, the pull-up controller 411 of the first pre-driver 410 may be defined as including the eighth to tenth NOR elements NOR18 to NOR20, and the pull-down controller 412 of the first pre-driver 410 may be defined as including the fifth to seventh NOR elements NOR15 to NOR17. Compared to the embodiment of FIG. 5, the configuration of the pull-up controller 411 of the first pre-driver 410 may be changed in FIG. 11. Therefore, the connection relationship between data multiplexers and the logic elements of the pull-up controller 411 may be different from that described with reference to FIG. 5.

An example operation of the transmitter 400 of FIG. 11 may be described with reference to FIGS. 12A and 12B below. Because logic elements related to a pull-down operation of the transmitter 400 of FIG. 11 may be implemented in the same manner as in the embodiment of FIG. 5, only descriptions related to the pull-up operation are given below with reference to FIGS. 12A and 12B.

Referring to FIG. 12A, at the edge timing of the first clock signal CLK0, each of the first data D1 and the second data D2 may have a bit value of "1", and a value of "10" may be provided to an input of the tenth NOR element NOR20. According to the operation result of the tenth NOR element NOR20, the first pull-up signal P1 may be in a logic low state, and the pull-up circuit of the first driver 331 may be turned on. Similarly, at the edge timing of the second clock signal CLK90, each of the first data D1 and the second data D2 may have a bit value of "1", and a value of "01" may be provided to the input of the tenth NOR element NOR20. According to the operation result of the tenth NOR element NOR20, the first pull-up signal P1 may be in a logic low state, and the pull-up circuit of the first driver may be turned on. According to the operations described above, the first data D1 having a bit value of "1" and the second data D2 having a bit value of "1" may be sequentially output at the edge timing of the first clock signal CLK0 and the edge timing of the second clock signal CLK90.

The case where the bit value of the first data D1 and the second data D2 is "00" is described below with reference to FIG. 12B. At the edge timing of the first clock signal CLK0, each of the first data D1 and the second data D2 may have a bit value of "0", and a value of "00" may be provided to the input of the tenth NOR element NOR20. According to the operation result of the tenth NOR element NOR20, the first pull-up signal P1 may be in a logic high state, and the pull-up circuit of the first driver 331 may be turned off. Similarly, at the edge timing of the second clock signal CLK90, each of the first data D1 and the second data D2 may have a bit value of "0", and a value of "00" may be provided to the input of the tenth NOR element NOR20. According to the operation result of the tenth NOR element NOR20, the first pull-up signal P1 may be in a logic high state, and the pull-up circuit of the first driver 331 may be turned off. According to the operations described above, the first data D1 having a bit value of "0" and the second data D2 having a bit value of "0" may be sequentially output at the edge timing of the first clock signal CLK0 and the edge timing of the second clock signal CLK90.

The case where the bit value of the first data D1 and the second data D2 is "10" is described below with reference to FIG. 12B. At the edge timing of the first clock signal CLK0, the first data D1 and the second data D2 may respectively have a bit value of "1" and a bit value of "0", and a value of "10" may be provided to the input of the tenth NOR element NOR20. According to the operation result of the tenth NOR element NOR20, the first pull-up signal P1 may be in a logic low state, and the pull-up circuit of the first driver 331 may be turned on. At the edge timing of the second clock signal CLK90, the first data D1 and the second data D2 may respectively have a bit value of "1" and a bit value of "0", and a value of "00" may be provided to the input of the tenth NOR element NOR20. According to the operation result of the tenth NOR element NOR20, the first pull-up signal P1 may be in a logic high state, and the pull-up circuit of the first driver 331 may be turned off. According to the operations described above, the first data D1 having a bit value of "1" and the second data D2 having a bit value of "0" may be sequentially output at the edge timing of the first clock signal CLK0 and the edge timing of the second clock signal CLK90.

Figure 13:
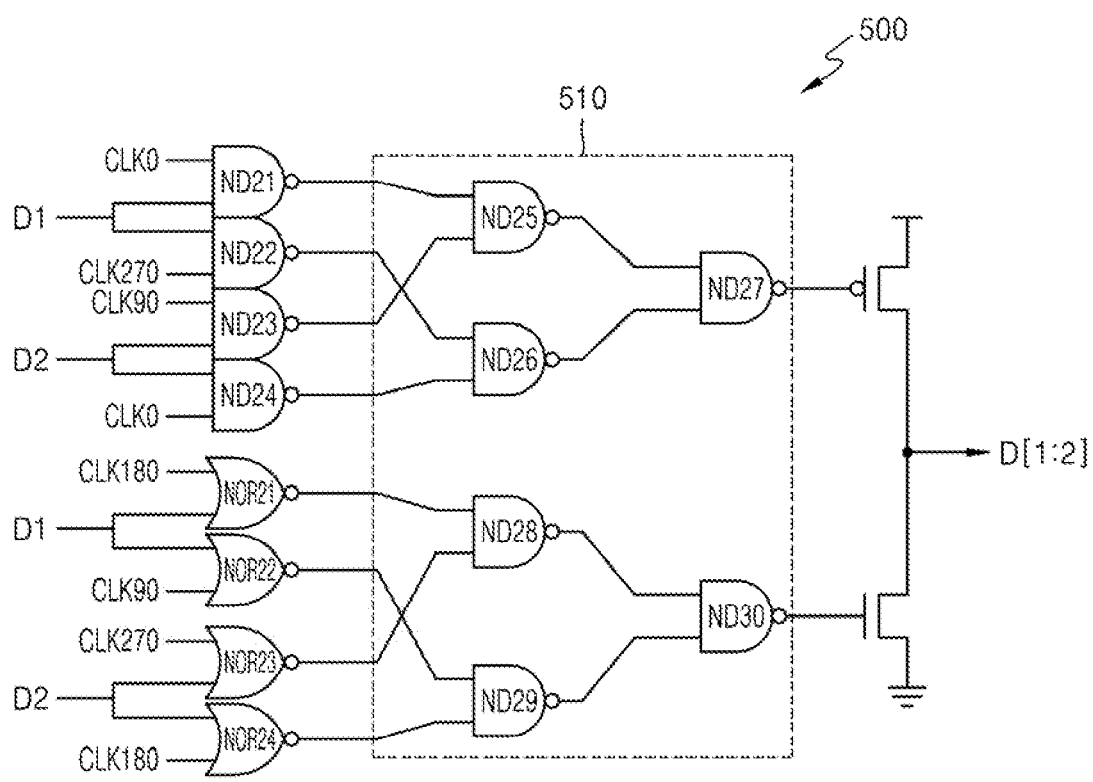
FIGS. 13 to 15 are circuit diagrams showing transmitters according to example embodiments.
Figure 14:
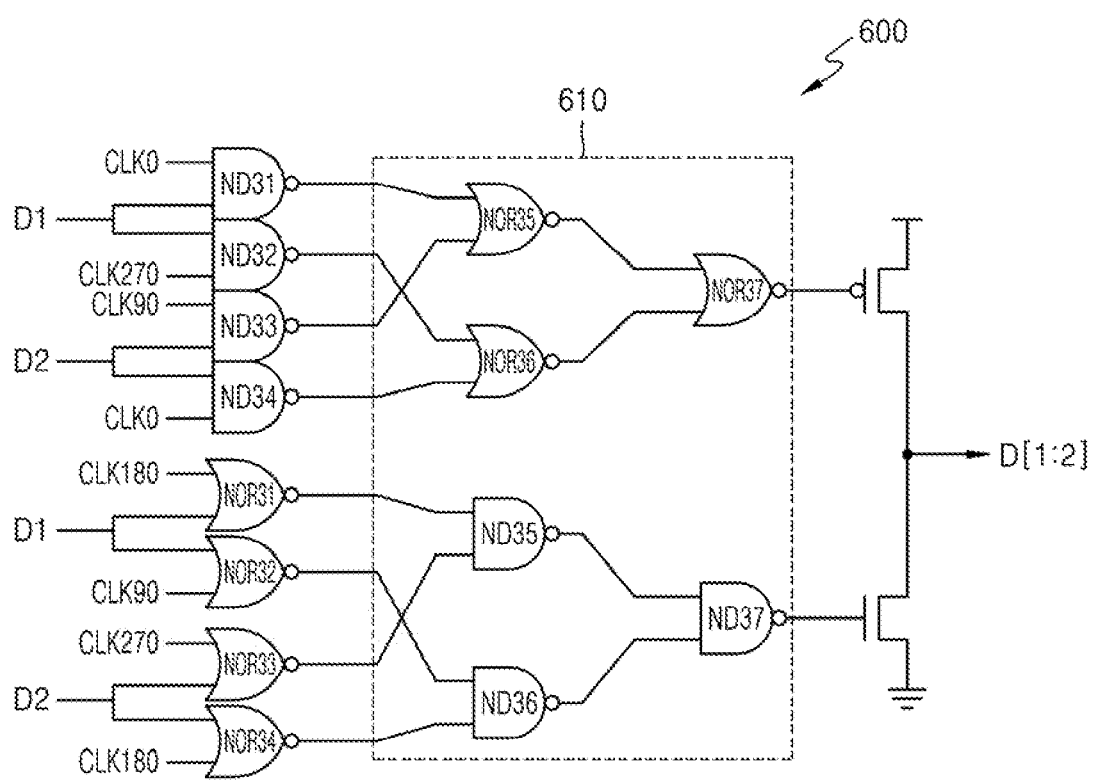
Figure 15:
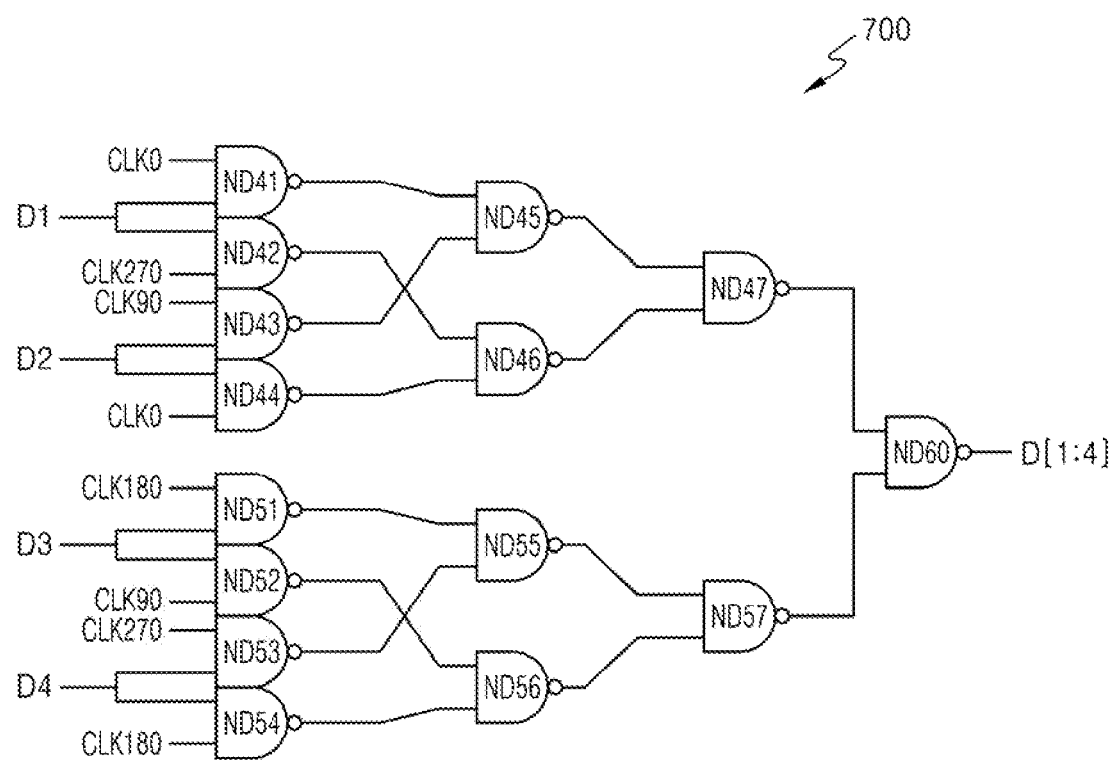

FIGS. 13 to 15 are circuit diagrams showing transmitters according to example embodiments. For convenience of description, FIGS. 13 and 14 illustrate only logic elements that are related to the first data D1 and the second data D2 in transmitters 500 and 600.

Referring to FIG. 13, the transmitter 500 may include a plurality of logic elements. The transmitter 500 may include first to seventh NAND elements ND21 to ND27 in relation to a pull-up path. The transmitter 500 may also include first to fourth NOR elements NOR21 to NOR24 and eighth to tenth NAND elements ND28 to ND30 in relation to a pull-down path. In the embodiment of FIG. 13, the transmitter 500 may include a first pre-driver 510 in correspondence to the first data D1 and the second data D2. The first pre-driver 510 may include the fifth to seventh NAND elements ND25 to ND27 as logic elements related to the pull-up path and the eighth to tenth NAND elements ND28 to ND30 as logic elements related to the pull-down path.

In the embodiment of FIG. 13, the first pre-driver 510 may be implemented by using NAND elements. Accordingly, in a pull-down operation, the eighth to tenth NAND elements ND28 to ND30 may generate a pull-down signal in a manner corresponding to the logical operation of the fifth to seventh NAND elements ND25 to ND27 in a pull-up operation and provide the pull-down signal to a pull-down circuit of a driver. Compared to the embodiment of FIG. 5, the configuration of the pull-down controller of the first pre-driver 510 may be changed in FIG. 13. Therefore, the connection relationship between data multiplexers and the logic elements of the pull-down controller may be different from that described with reference to FIG. 5.

Referring to FIG. 14, the transmitter 600 may include a plurality of logic elements. The transmitter 600 may include first to fourth NAND elements ND31 to ND34 and fifth to seventh NOR elements NOR35 to NOR37 in relation with a pull-up path. The transmitter 600 may also include first to fourth NOR elements NOR31 to NOR34 and fifth to seventh NAND elements ND35 to ND37 in relation with a pull-down path. In the embodiment of FIG. 14, the transmitter 600 may include a first pre-driver 610 in correspondence to the first data D1 and the second data D2. The first pre-driver 610 may include the fifth to seventh NOR elements NOR35 to NOR37 as logic elements related to the pull-up path and the fifth to seventh NAND elements ND35 to ND37 as logic elements related to the pull-down path.

In the embodiment of FIG. 14, the first pre-driver 610 may be implemented by using NAND elements and NOR elements. Compared to the embodiment of FIG. 5, the configurations of the pull-down controller and the pull-up controller of the first pre-driver 610 are changed in FIG. 14. Therefore, the connection relationship between data multiplexers and the logic elements of the pull-up controller and the connection relationship between the data multiplexers and the pull-down controller may be different from those described with reference to FIG. 5.

An example in which the number of drivers is reduced compared to the embodiments described above is described with reference to FIG. 15 below. FIG. 15 illustrates the case where a logic element (e.g., a NAND element) corresponding to the last stage functions as a driver without separating a pull-up path from a pull-down path. In an implementation, when a transmitter 700 receives the first to fourth data D1 to D4 in parallel, a logic element ND60 may be provided in correspondence to the first to fourth data D1 to D4 and may sequentially output the first to fourth data D1 to D4.

The transmitter 700 may include logic elements ND41 to ND44, which perform a data multiplexer function with respect to the first data D1 and the second data D2, and logic elements ND51 to ND54, which perform a data multiplexer function with respect to the third data D3 and the fourth data D4. The transmitter 700 may further include logic elements ND45 to ND47, which perform a pre-driver function with respect to the first data D1 and the second data D2, and logic elements ND55 to ND57, which perform a pre-driver function with respect to the third data D3 and the fourth data D4. In an example implementation, an operation may be performed on the first data D1 and each of the first clock signal CLK0 and the fourth clock signal CLK270, an operation may be performed on the second data D2 and each of the first clock signal CLK0 and the second clock signal CLK90, an operation may be performed on the third data D2 and each of the second clock signal CLK90 and the third clock signal CLK180, and an operation may be performed on the fourth data D4 and each of the third clock signal CLK180 and the fourth clock signal CLK270.

The transmitter 700 may be implemented by using NAND elements in FIG. 15. In an implementation, a transmitter performing the same function as or a similar function to the transmitter 700 of FIG. 15 may be implemented by using NOR elements or a combination of NOR elements and NAND elements. Alternatively, a transmitter may be implemented by using different kinds of logic elements than those described above.

Figure 16:
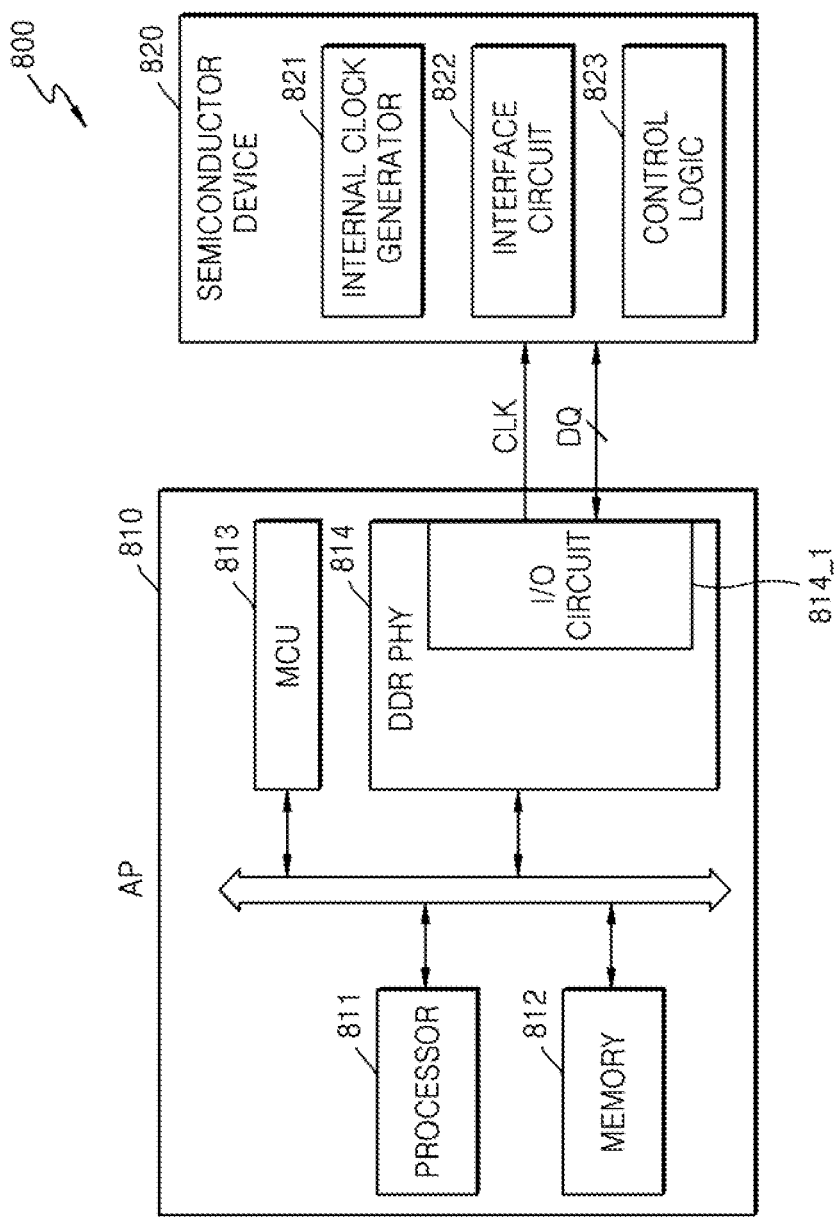
FIG. 16 is a block diagram showing a data processing system including a system-on-chip according to an example embodiment.

FIG. 16 is a block diagram showing a data processing system including a system-on-chip according to an example embodiment. Referring to FIG. 16, a data processing system 800 may include an application processor (AP) 810 and a semiconductor device 820. The AP 810 may include a System on Chip (SoC). The semiconductor device 820 may include an internal clock generator 821, an interface circuit 822, and a control logic 823. The interface circuit 822 may include a double data rate (DDR) physical layer (PHY).

The internal clock generator 821 may receive the clock signal CLK from the AP 810 and generate an internal clock signal based on the clock signal CLK. The internal clock generator 821 may generate the multi-phase clock signal described above in the embodiments. When the semiconductor device 820 corresponds to a memory device, the AP 810 may provide, as the clock signal CLK, the write clock WCK according to a certain standard. The control logic 823 may generally control internal operations of the semiconductor device 820 and may perform a control operation such that a transmitter included in the interface circuit 822 functions according to embodiments.

The AP 810 may include various types of intellectual property (IP). In an implementation, the AP 810 may include a processor 811, which generally controls operations, and a memory 812, which stores instructions executable by the processor 811.

The AP 810 may further include a memory control module (MCU) 813, which may control an external memory device under control by the processor 811, and a double data rate physical layer (DDR PHY) 814, which may provide an interface with the outside of the AP 810. The DDR PHY 814 may include a transmitter according to embodiments.

Standards of various kinds of system buses may be applied to the AP 810. In an implementation, the advanced microcontroller bus architecture (AMBA) protocol of Advanced RISC Machine (ARM) may be used. Bus types of the AMBA protocol may include an advanced high-performance bus (AHB), an advanced peripheral bus (APB), an advanced extensible interface (AXI), AXI4, and AXI coherency extensions (ACE). Besides the above, other types of protocols, such as uNetwork of SONICs Inc., CoreConnect of IBM, and Open Core Protocol of OCP-IP, may be used.

According to an embodiment, the transmitter may be included in various kinds of semiconductor devices. In an implementation, the semiconductor device 820 may correspond to various kinds of devices, such as a device outputting data to the AP 810, an image processing unit outputting image data, a non-volatile memory device storing content, and a communication unit providing the AP 810 with data received from the outside in a wired or wireless connection. According to an embodiment, a transmitter included in each of the AP 810 and the semiconductor device 820 may include fewer drivers than pieces of data received in parallel.

While the inventive concept has been particularly shown and described with reference to embodiments thereof, it will be understood that various changes in form and details may be made therein without departing from the spirit and scope of the following claims.

By way of summation and review, a transmitter transmitting data at a high speed and low power based on multi-phase clock signals is disclosed. Memory devices may operate according to various specifications, such as LPDDR specifications and DDRx. Memory devices may receive a certain clock signal from a memory controller, generate multi-phase clock signals by using the received clock signal, and receive write data or transmit read data from or to the memory controller by using the multi-phase clock signals. When data is transmitted or received using multi-phase clock signals, it is required to increase the transmission speed of the data and decrease power consumption.

A transmitter for increasing a data transmission speed and decreasing power consumption when converting parallel data into serial data by using multi-phase clock signals, a memory device including the same, and a semiconductor device including the transmitter is disclosed.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, or elements described in connection with a particular embodiment may be used singly or in combination with features, characteristics, or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A transmitter configured to receive first to N-th data in parallel and sequentially output the first to N-th data in response to first to N-th clock signals having different phases from each other, where N is an integer of at least 2, the transmitter comprising:
first to N-th data selectors including a first data selector and a second data selector in correspondence to the first to N-th data, each of the first to N-th data selectors being configured to perform a logical operation on a corresponding data of the first to N-th data and each clock signal of the first to N-th clock signals and output a plurality of data selection signals;

a first pre-driver in correspondence to at least two data selectors among the first to N-th data selectors, the first pre-driver being configured to receive the plurality of data selection signals from each data selector of the at least two data selectors and output a first pull-up signal and a first pull-down signal by performing a logical operation on the plurality of data selection signals; and a first driver in correspondence to the first pre-driver, the first driver being configured to sequentially output at least two pieces of data in response to the first pull-up signal and the first pull-down signal.

2. The transmitter as claimed in claim 1, wherein:

a first set of the plurality of data selection signals output from each of the first to N-th data selectors do not toggle, and a second set of the plurality of data selection signals output from each of the first to N-th data selectors toggle.

3. The transmitter as claimed in claim 1, wherein:

a first set of the plurality of data selection signals output from each of the first to N-th data selectors are transmitted through a pull-up path configured to output logic high data, and a second set of the plurality of data selection signals output from each of the first to N-th data selectors are transmitted through a pull-down path configured to output logic low data.

4. The transmitter as claimed in claim 3, wherein, when the first set of the plurality of data selection signals transmitted through the pull-up path toggle, the second set of the plurality of data selection signals transmitted through the pull-down path do not toggle.

5. The transmitter as claimed in claim 1, wherein:

each of the first to N-th data selectors includes first to N-th logic elements configured to perform the logical operation on a corresponding one of the first to N-th data and a corresponding one of the first to N-th clock signals, and the first to N-th logic elements include at least one of a NAND element and a NOR element.

6. The transmitter as claimed in claim 1, wherein:

the first to N-th clock signals include first to fourth clock signals having a phase difference of 90 degrees from each other, and the transmitter is further configured to receive first to fourth data in parallel and sequentially output the first to fourth data in response to edge timings of the first to fourth clock signals.

7. The transmitter as claimed in claim 6, wherein:

the first data selector is configured to perform a logical operation on the first data and the first to fourth clock signals and output first and second pull-up data selection signals through a first pull-up path and first and second pull-down data selection signals through a first pull-down path, and the second data selector is configured to perform a logical operation on the second data and the first to fourth clock signals and output third and fourth pull-up data selection signals through the first pull-up path and third and fourth pull-down data selection signals through the first pull-down path.

8. The transmitter as claimed in claim 1, wherein the first pre-driver is provided in correspondence to the first data selector and the second data selector, and the first pre-driver includes:

a first pull-up controller configured to receive first to fourth pull-up data selection signals through a first pull-up path and output the first pull-up signal by performing a logic operation on the first to fourth pull-up data selection signals; and a first pull-down controller configured to receive the first to fourth pull-down data selection signals through the first pull-down path and output the first pull-down signal by performing a logic operation on the first to fourth pull-down data selection signals.

9. The transmitter as claimed in claim 8, wherein the first driver is further configured to output the first data at an edge timing of the first clock signal and the second data at an edge timing of the second clock signal in response to the first pull-up signal and the first pull-down signal.

10. The transmitter as claimed in claim 8, wherein the first to N-th data selectors further includes:

a third data selector is configured to perform a logical operation on the third data and first to fourth clock signals and output fifth and sixth pull-up data selection signals through a second pull-up path and fifth and sixth pull-down data selection signals through a second pull-down path; and a fourth data selector configured to perform a logical operation on the fourth data and the first to fourth clock signals and output seventh and eighth pull-up data selection signals through the second pull-up path and seventh and eighth pull-down data selection signals through the second pull-down path.

11. The transmitter as claimed in claim 10, further comprising:

a second pre-driver in correspondence to the third data selector and the fourth data selector; and a second driver in correspondence to the second pre-driver, the second driver being configured to output the third data at an edge timing of the third clock signal and the fourth data at an edge timing of the fourth clock signal.

12. The transmitter as claimed in claim 11, wherein the second pre-driver includes:

a second pull-up controller configured to receive the fifth to eighth pull-up data selection signals through the second pull-up path, perform a logic operation on the fifth to eighth pull-up data selection signals, and output a second pull-up signal to a pull-up circuit of the second driver; and a second pull-down controller configured to receive the fifth to eighth pull-down data selection signals through the second pull-down path, perform a logic operation on the fifth to eighth pull-down data selection signals, and output a second pull-down signal to a pull-down circuit of the second driver.

13. A memory device comprising:

a memory cell array storing data;

a multi-phase clock generator configured to generate first to fourth clock signals in relation with transmission or reception of the data, the first to fourth clock signals having a phase difference of 90 degrees from each other; and a transmitter configured to output the data to an external device in response to the first to fourth clock signals, wherein the transmitter includes:

first to fourth data selectors in correspondence to first to fourth data, each data selector of the first to fourth data selectors being configured to perform a logical operation on a corresponding one of the first to fourth data and each clock of the first to fourth clock signals and output a plurality of data selection signals;

a first pre-driver in correspondence to the first and second data selectors, the first pre-driver being configured to receive data selection signals from each data selector of the first data selector and the second data selector and output a first pull-up signal and a first pull-down signal by performing a logic operation on the data selection signals; and a first driver in correspondence to the first pre-driver, the first driver being configured to sequentially output the first data and the second data in response to the first pull-up signal and the first pull-down signal.

14. The memory device as claimed in claim 13, further comprising:

a second pre-driver in correspondence to the third and fourth data selectors, the second pre-driver being configured to receive data selection signals related to the third data and the fourth data and output a second pull-up signal and a second pull-down signal by performing a logic operation on the data selection signals related to the third data and the fourth data; and a second driver in correspondence to the second pre-driver, the second driver being configured to sequentially output the third data and the fourth data in response to the second pull-up signal and the second pull-down signal.

15. The memory device as claimed in claim 13, wherein:

the first data selector is configured to perform a logical operation on the first data and the first to fourth clock signals and output first and second pull-up data selection signals through a first pull-up path and first and second pull-down data selection signals through a first pull-down path, and the second data selector is configured to perform a logical operation on the second data and the first to fourth clock signals and output third and fourth pull-up data selection signals through the first pull-up path and third and fourth pull-down data selection signals through the first pull-down path.

16. The memory device as claimed in claim 15, wherein the first pre-driver includes:

a pull-up controller configured to receive the first to fourth pull-up data selection signals through the first pull-up path and output the first pull-up signal by performing a logic operation on the first to fourth pull-up data selection signals; and a pull-down controller configured to receive the first to fourth pull-down data selection signals through the first pull-down path and output the first pull-down signal by performing a logic operation on the first to fourth pull-down data selection signals.

17. The memory device as claimed in claim 16, wherein the first driver is further configured to output the first data at an edge timing of the first clock signal and the second data at an edge timing of the second clock signal in response to the first pull-up signal and the first pull-down signal.

18. A semiconductor device comprising:

an interface circuit configured to communicate data with an external device; and a multi-phase clock generator configured to generate first to N-th clock signals in relation with transmission or reception of the data, the first to N-th clock signals having different phases from each other, where N is an integer of at least 2, wherein the interface circuit includes a transmitter in correspondence to one of a plurality of data channels, and the transmitter includes:

first to N-th data selectors in correspondence to the first to N-th data, each data selector of the first to N-th data selectors being configured to perform a logical operation on a corresponding one of the first to N-th data and each clock signal of the first to N-th clock signals and output a plurality of data selection signals;

a pre-driver in correspondence to first to M-th data selectors among the first to N-th data selectors, the pre-driver being configured to receive the plurality of data selection signals from each data selector of the first to M-th data selectors and output a pull-up signal and a pull-down signal by performing a logical operation on the plurality of data selection signals, where M is an integer that is greater than or equal to 2 and less than N; and a driver in correspondence to the pre-driver, the driver being configured to sequentially output the first to M-th data at edge timings of the first to M-th clock signals in response to the pull-up signal and the pull-down signal.

19. The semiconductor device as claimed in claim 18, further comprising a memory controller configured to control a memory operation of an external memory, wherein the memory controller is further configured to sequentially output the first to M-th data to the external memory device through one of the plurality of data channels.

20. The semiconductor device as claimed in claim 18, wherein, among the plurality of data selection signals from one of the first to N-th data selectors, data selection signals provided through one of a pull-up path and a pull-down path toggle, and data selection signals provided through the other of the pull-up path and the pull-down path do not toggle.

* * * * *